(12) United States Patent
Fee et al.

(10) Patent No.: US 11,065,601 B2
(45) Date of Patent: Jul. 20, 2021

(54) SEPARATION MEDIUM

(71) Applicant: University of Canterbury, Christchurch (NZ)

(72) Inventors: Conan Jeffery Fee, Christchurch (NZ); Simone Dimartino, Christchurch (NZ); Tim Huber, Christchurch (NZ)

(73) Assignee: University of Canterbury, Christchurch (NZ)

( * ) Notice: Subject to any disclaimer, the term of this patent is extended or adjusted under 35 U.S.C. 154(b) by 200 days.

(21) Appl. No.: 16/063,468

(22) PCT Filed: Dec. 16, 2016

(86) PCT No.: PCT/IB2016/057694
§ 371 (c)(1),
(2) Date: Jun. 18, 2018

(87) PCT Pub. No.: WO2017/103863
PCT Pub. Date: Jun. 22, 2017

(65) Prior Publication Data
US 2018/0369785 A1 Dec. 27, 2018

(30) Foreign Application Priority Data
Dec. 18, 2015 (NZ) ........................................ 715087

(51) Int. Cl.
*B01J 20/291* (2006.01)
*B01J 41/20* (2006.01)
(Continued)

(52) U.S. Cl.
CPC .......... *B01J 20/291* (2013.01); *B01D 15/363* (2013.01); *B01J 20/24* (2013.01); *B01J 20/268* (2013.01);
(Continued)

(58) Field of Classification Search
CPC ........ B01J 20/291; B01J 20/24; B01J 20/268; B01J 20/28; B01J 20/28014;
(Continued)

(56) References Cited

U.S. PATENT DOCUMENTS 5,059,266 A  10/1991 Yamane et al.
5,238,613 A  8/1993 Anderson
(Continued)

FOREIGN PATENT DOCUMENTS

CA    2185140      3/1996
DE    102004034269  2/2006
(Continued)

OTHER PUBLICATIONS

Nawada, S., "3D printing of chromatography media: closing the loop between real word experiments and computer simulations" 44th International Symposium on High Performance Liquid Phase Separations and Related Techniques, HPLC 2016, Jun. 19-24, 2016, San Francisco, CA, USA.
(Continued)

*Primary Examiner* — Katherine Zalasky McDonald
(74) *Attorney, Agent, or Firm* — Lewis Kohn & Walker LLP; David M. Kohn; Kari Moyer-Henry

(57) ABSTRACT

A separation medium for use in the separation of analytes from a feed stream containing suspended solids, processes of separation using the separation medium, and the use of the separation medium to separate analytes from a feed stream containing suspended solids. The separation medium is provided as a hydrogel having a structure whose surfaces are defined by a triply periodic minimal surface, the hydrogel comprising at least one ligand that binds at least one target analyte.

24 Claims, 14 Drawing Sheets

(51) Int. Cl.

| | | |
|---|---|---|
| *B01J 20/32* | (2006.01) | |
| *B01J 20/28* | (2006.01) | |
| *B01J 39/26* | (2006.01) | |
| *B01J 20/286* | (2006.01) | |
| *B01J 20/30* | (2006.01) | |
| *B01J 20/26* | (2006.01) | |
| *B01J 20/24* | (2006.01) | |
| *B01D 15/36* | (2006.01) | |
| *B01D 15/32* | (2006.01) | |

(52) U.S. Cl.
CPC .............. *B01J 20/28* (2013.01); *B01J 20/286* (2013.01); *B01J 20/28014* (2013.01); *B01J 20/28047* (2013.01); *B01J 20/3007* (2013.01); *B01J 20/3057* (2013.01); *B01J 20/3071* (2013.01); *B01J 20/3242* (2013.01); *B01J 39/26* (2013.01); *B01J 41/20* (2013.01); *B01D 15/327* (2013.01); *B01D 15/361* (2013.01); *B01J 2220/54* (2013.01); *B01J 2220/58* (2013.01)

(58) Field of Classification Search
CPC ................ B01J 20/28047; B01J 20/286; B01J 20/3007; B01J 20/3057; B01J 20/3071; B01J 20/3242; B01J 20/265; B01J 20/3246; B01J 39/26; B01J 41/20; B01J 2220/54; B01J 2220/58; B01D 15/363; B01D 15/327; B01D 15/361; B01D 15/362; B01D 15/32
See application file for complete search history.

(56) References Cited

U.S. PATENT DOCUMENTS

| | | | |
|---|---|---|---|
| 5,512,091 | A | 4/1996 | Steiner |
| 5,653,925 | A | 8/1997 | Batchelder |
| 5,714,103 | A | 2/1998 | Bauer et al. |
| 6,106,721 | A | 8/2000 | Bouvier et al. |
| 6,414,043 | B1 | 7/2002 | Asher et al. |
| 6,534,083 | B2 | 3/2003 | Gilding et al. |
| 7,051,654 | B2 | 5/2006 | Boland et al. |
| 7,077,638 | B2 | 7/2006 | Leyden et al. |
| 7,226,535 | B2 | 6/2007 | Hubbuch et al. |
| 7,799,839 | B2 | 9/2010 | Yum et al. |
| 8,029,857 | B2 | 10/2011 | Hoek et al. |
| 8,318,192 | B2 | 11/2012 | Boyan et al. |
| 8,470,231 | B1 | 6/2013 | Dikovsky et al. |
| 8,691,974 | B2 | 4/2014 | Gatenholm et al. |
| 8,784,662 | B2 | 6/2014 | Becker et al. |
| 8,871,016 | B2 | 10/2014 | Trexler et al. |
| 8,883,184 | B2 | 11/2014 | Hill et al. |
| 8,883,185 | B2 | 11/2014 | Bennett et al. |
| 2002/0102674 | A1 | 8/2002 | Anderson |
| 2003/0040119 | A1 | 2/2003 | Takayama et al. |
| 2004/0011876 | A1 | 6/2004 | Yavorsky et al. |
| 2004/0104156 | A1 | 6/2004 | Kolesinski et al. |
| 2006/0147344 | A1 | 7/2006 | Ahn et al. |
| 2006/0195179 | A1 | 8/2006 | Sun et al. |
| 2007/0063371 | A1 | 3/2007 | Sato et al. |
| 2007/0116607 | A1 | 5/2007 | Wang et al. |
| 2011/0012240 | A1 | 5/2011 | Khine et al. |
| 2011/0106569 | A1 | 5/2011 | Price |
| 2011/0293918 | A1 | 12/2011 | Lucas et al. |
| 2012/0037567 | A1 | 2/2012 | Knight et al. |
| 2013/0112623 | A1 | 5/2013 | Fernandez-Lahore et al. |
| 2013/0230721 | A1 | 9/2013 | Coupland |
| 2013/0236431 | A1 | 9/2013 | Gourdie et al. |
| 2014/0014493 | A1 | 1/2014 | Ryan |

FOREIGN PATENT DOCUMENTS

| | | |
|---|---|---|
| EP | 0316642 | 5/1989 |
| EP | 1864777 | 9/2009 |
| EP | 2236522 | 10/2010 |
| EP | 1877113 | 11/2011 |
| EP | 2436510 | 4/2012 |
| EP | 2583744 | 4/2013 |
| EP | 2679669 | 1/2014 |
| EP | 2889617 | 7/2015 |
| GB | 1202441 | 8/1970 |
| WO | 9007545 | 7/1990 |
| WO | 1994019687 | 9/1994 |
| WO | 1999009149 | 2/1999 |
| WO | 2000050888 | 8/2000 |
| WO | 2001044141 | 6/2001 |
| WO | 2002065515 | 8/2002 |
| WO | 03089506 | 10/2003 |
| WO | 2003079985 | 10/2003 |
| WO | 2004073843 | 9/2004 |
| WO | 20060011771 | 1/2006 |
| WO | 2006091653 | 8/2006 |
| WO | 2006110537 | 10/2006 |
| WO | 2007038982 | 4/2007 |
| WO | 2007044088 | 4/2007 |
| WO | 2007112491 | 10/2007 |
| WO | 2007136227 | 11/2007 |
| WO | 2010030964 | 3/2010 |
| WO | 2010059715 | 5/2010 |
| WO | 2012032325 | 3/2012 |
| WO | 2012077080 | 6/2012 |
| WO | 2012143182 | 10/2012 |
| WO | 2014022535 | 2/2014 |
| WO | 2014110679 | 7/2014 |
| WO | 2016188606 | 12/2016 |

OTHER PUBLICATIONS

Nawada, S., "Effects of Particle Shape and Linear Defects in Porous Media Studied through 3D Printing" BioProcessing Network Conference 2014, Sep. 21-22, 2015, Wellington, New Zealand.

Nawada, S., "Effects of Line Defects in Porous Media Studied through 3D Printing" 28th International Symposium on Prepartive and Process Chromatography, PREP 2015, Jul. 26-29, 2015, Philadelphia, PA, USA.

Nawada, S., "Triply Periodic Minimal Surfaces as Stationary Phase Microstructures" 29th International Symposium on Preparative and Process Chromatography, PREP 2016, Jul. 17-20, 2016, Philadelphia, PA, USA.

Rezanavaz, R., "Highly Porous "Clickable" Polymer as Stationary Phase for Separation of Biomolecules" BioProcessing Network Conference 2014, Sep. 21-22, 2015, Wellington, New Zealand; BPN poster 2015 Roya.

Gordon, A., "Factors influencing 1,1'carbonyldiimidazole activation of cross-linked agarose and subsequent ligand coupling for chromatography stationary phase" BioProcessing Network Conference 2014, Sep. 21-22, 2015, Wellington, New Zealand; BPN poster 2015 Anne.

Dolamore, F., "Computational Fluid Dynamic Studies of Novel 3D Printed Chromatography Columns" BioProcessing Network Conference 2014, Sep. 21-22, 2015, Wellington, New Zealand; BPN poster 2015 Fabian.

Fee, C.J., "3D Printed Resins: a novel alternative to pre-packed chromatography columns?" Downstream Processing World Congress, Feb. 24-25, 2015, Munich, Germany.

Examination Report of corresponding Indian Patent Application No. 201837022235 dated Feb. 26, 2020.

Rahikkala, A. et al., "Thermoresponsive Nanoparticles of Self-Assembled Block Copolymers as Potential Carriers for Drug Delivery and Diagnostics", Biomacromolecules, Jul. 2015, 16(9), p. 2750-2756.

Nykanen, A. et al., "Phase Behavior and Temperature-Responsive Molecular Filters Based on Self-Assembly of Polystyrene-block-poly(N-isopropylacrylamide)-block-polystyrene", Macromolecules, 2007, 40(16), p. 5827-5834.

Noelting, B., "Methods in Modem Biophysics", Springer, Berlin, 2nd edition, 2005, ISBN 3-540-27703, Chapter 2, p. 23-35.

Sharifi, S. et al., "Biodegradable nanocomposite hydrogel structures with enhanced mechanical properties prepared by photo-

(56) References Cited

OTHER PUBLICATIONS crosslinking solutions of poly(trimethylene carbonate)—poly(ethylene glycol)—poly(trimethylene carbonate) macromonomers and nanoclay particles", Acta Biomaterialia, 2012, 8, p. 4233-4243.
Zou, X. et al., "A mesoporous germanium oxide with crystalline pore walls and its chiral derivative", Nature, 2005, 437(29), p. 716-719.
Toufik, et al., "Relationship between reduction of complement activation by polysaccharide surfaces bearing diethylaminoethyl groups and their degree of substitution." Biomaterials, 1995, 16(14), 1081-1088. doi: 10.1016/0142-9612(95)98904-s.
Bethell, G.S. et al., "Investigation of the activation of various insoluble polysaccharides with 1,1'-carbonyldiimidazole and of the properties of the activated matrices." Journal of Chromatography A, 1987, 219(3), 361-371.
Hermanson, G. T. et al., Immobilized affinity ligand techniques: Academic Press, 1992.
Tari, C. et al., Colloid deposition experiments as a diagnostic tool for biomass attachment onto bioproduct adsorbent surfaces. Journal of Chemical Technology and Biotechnology, 2008, 83(2), 183-191. doi:10.1002/jctb.1852).
Henriksson et al., "Novel nanocomposite concept based on cross-linking of hyperbranched polymers in reactive aellulose nanopaper templates." Comp. Sci. & Tech., 2011, 71(1):13-17.
"Injectable polysaccharide hydrogels reinforced with cellulose nanocrystals: morphology, rheology, degradation, and cytotoxicity." Biomacromolecules. Dec. 9, 2013;14(12):4447-55.
Melchels, Ferry P.W. et al., "Solid freeform fabrication of hydrogel structures and cell encapsulation." Abstract. In Annual Conference of the Tissue Engineering and Regenerative Medicine, Asia-Pacific Chapter (Termis-Ap 2010), 15-17 Sep. 2010, Sheraton on the Park, Sydney.
Beck et al., "Designed biodegradable hydrogel structures prepared by stereolithography using poly(ethylene glycol)/ poly(D,L-lactide)-based resins." J Control Release. 2010 Nov 20, 148(1):34-41.
Cooper McDonald et al., "Prototyping of Microfluidic Devices in Poly(dimethylsiloxane) Using Solid-Object Printing" Anal. Chem. 2002, 74, 1537-1545.
Uni Minnesota UROP Project Ideas.
Fee et al., "3D printed porous media columns with fine control of columnpacking morphology", Journal of Chromatography A, 1333 (2014) 18-24.
Niawada et al., "The Effects of Bead Overlap on Performance of 3D Printed Packed Bed Columns", International Labmate, Apr. 14, 2014.
"Global Protein Purification Reagents Market: An Expanding Role in Biopharmaceutical; Diagnostics; and Basic Biomedical Research." Frost & Sullivan, Sep. 2011.
http://3dprintinggel.com/, accessed Dec. 2014.
3D Printing Technology Insight Report: An analysis of patenting activity around 3D-Printing from 1990-Current, 2014.
"Preparation and Characterization of Novel Micro- and Nanocomposite Hydrogels Containing Cellulosic Fibrils." J. Agric. Food Chem. 2011, 59, 9433-9442.
Chang et al., "Cellulose-based hydrogels: Present status and application prospects." Carbohydrate Polymers 84 (2011) 40-53.
Pataky et al., "Microdrop Printing of Hydrogel Bioinks into 3D Tissue-Like Geometries" Adv. Mater. 2012, 24, 391-396.
Qin et al., "Gelation behavior of cellulose in NaOH/urea aqueous system via cross-linking" Cellulose 2013, 20:1669-1677.
Weng et al., "Thermal Gelation of Cellulose in a NaOH/Thiourea Aqueous Solution" Langmuir 2004, 20:2086-2093.
Hearn, "Application of 1,1'-Carbonyldiimidazole-Activated Matrices for the Purification of Proteins IX*. Dynamic Multizoning Effects in Biospecific Affinity Chromatography on Porous Supports: Evaluation of Activation and Ligand Coupling Effects With Different Support Materials" Journal of Chromatography, 1986, 376 245-257.
Hearn et al., "Evaluation of factors which affect column performance with immobilized monoclonal antibodies." Journal of Chromatography, 1990, 512:23-39.
Hearn, "1,1'-Carbonyldiimidazole-Mediated Immobilization of Enzymes and Affinity Ligands" Methods in Enzymology, 1987, vol. 135 p. 102.
Bethell et al., "Investigation of the Activation of Various Insoluble Polysaccharides With 1,1'-Carbonyldiimidazole and of the Properties of the Activated Matrices." Journal of Chromatography, 1981, 219:361-372.
Suhas Nawada et al., "Re-Inventing the Packed Bed—Implications of 3D Printing for Chromatography." Jul. 14, 2013 Poster Prep 2013 and Jul. 14, 2013 Prep 2013 abstract and Presentation.
"3D Printed Porous Media—Fine Control of Packing Structures for Adsorption, Filtration and Catalysis" Fee et al., Nov. 25, 2013 nzccme2013_submission_67.
"3D Printed Chromatographic Stationary Phases" Simone Dimartino, Apr. 2, 2014 F&P abstract and presentation Fisher and Paykel Healthcare, Manukau, Auckland, New Zealand, Apr. 2, 2014.
"3D Printed Monoliths" Fee et al., May 30, 2014 MSS Plenary Presentation, Keynote Address, Monolith Symposium and Summer School, Portoroz, Slovenia, May 30-Jun. 4.
"All Cellulose Composite Hydrogels for the 3D printing of Adsorptive Media", Jun. 17, 2014 BIC-symposium—Tim.
"3D Printed Adsorptive Media" Jul. 23, 2014, Simone Dimartino, Jul. 23, 2014 Goldenlaser in visit at UC.
"3D Printing of Porous Media at the Microstructural Scale", Dimartino et al., Jul. 27, 2014 RXVI Oral Session Abstract Dimartino Fee and Nawada.
"3D Printing as a Tool for Examining Imperfections in Packed Bed Microstructures" Nawada et al., Jul. 27, 2014 RXVI Poster Session Abstract Nawada Dimartino and Fee, and Jul. 31, 2014 RXVI Defects Poster final.
"Opportunities and Challenges for 3D Printed Chromatography Columns and Solid Phases", Dimartino et al., Jul. 31, 2014 RXVI Presentation—public copy.
Aug. 2014 Description of Summer Scholarship No. 1.
Aug. 2014 Description of Summer Scholarship No. 2.
"Development and Modification of Cellulose Based Hydrogels for Chromatography", Gordon et al., Oct. 22, 2014 BPN Poster Final.
"3D Printing of Microstructured Chromatographic Media", Simone Dimartino, Oct. 22, 2014 BPN Presentation Dimartino and Oct. 24, 2014 BPN Abstract Oral Dimartino.
"Development and Modification of Cellulose Based Hydrogels for Chromatography" Gordon et al., Oct. 22, 2014 BPN Presentation Dimartino and Oct. 24, 2014 BPN abstract Anne.
"3D Printing Cellulose Hydrogels" Nov. 11, 2014 Kate Sterling—Cellulose Poster.
"Cross-linked all-cellulose composite hydrogels made from aqueous NaOH/urea solutions" Apr. 6, 2015 ISSIB_15—Tim.
"Disrupting the Packed Bed: 3D Printing of Chromatography Columns" Fee et al., Prep Oral Abstract Jul. 2, 2015.
Huber, T., "Effect of Urea Concentration on the Viscosity and Thermal Stability of Aqueous NaOH/Urea Cellulose Solutions." Journal of Polymers, vol. 2016, Article ID 2658747, 9 pages, 2016. https://doi.org/10.1155/2016/2658747.
Huber, T., "The effect of physical and chemical cross-linking on cellulose hydrogels made from aqueous NaOH/urea solutions", European Advanced Materials Congress 2016, Stockholm, Sweden, Aug. 23-25.
"Membranes in Bioprocessing Workshop", May 9-11, 2016, Bologna, Italy. Talk: Beyond membranes: 3D printing of structured porous media.
Dimartino, S., "Experimental and computational evaluation of new designs for 3D printed chromatography media" International Symposium on the Separation of Proteins, Peptides & Polynucleotides (ISPPP), Nov. 6-9, 2016, Salzburg, Austria.
Extended European Search Report of corresponding European Patent Application No. EP 16875032.1.
Torres-Rendon et al., "Bioactive Gyroid Scaffolds Formed by Sacrificial Templating of Nanocellulose and Nanochitin Hydrogels as Instructive Platforms for Biomimetic Tissue Engineering." (2015) Advanced Materials 27:2989-2995.

(56) References Cited

OTHER PUBLICATIONS

Supporting Information for Torres-Rendon et al., "Bioactive Gyroid Scaffolds Formed by Sacrificial Templating of Nanocellulose and Nanochitin Hydrogels as Instructive Platforms for Biomimetic Tissue Engineering." (2015) Advanced Materials 27:2989-2995.

Examination Report of corresponding Chinese Patent Application No. 2016800731377 dated Jun. 10, 2020.

Examination Report of corresponding Japanese Patent Application No. 2018-531418 dated Jun. 30, 2020.

SEPARATION MEDIUM

1. FIELD OF INVENTION

The invention relates generally to a separation medium comprising a hydrogel having a structure whose surfaces are defined by a triply periodic minimal surface, which can be used to separate target analytes, for example, desirable biomolecules, from a feed stream.

2. BACKGROUND OF INVENTION

Biomolecules are molecules present in living organisms, including large macromolecules such as proteins, polysaccharides, lipids, and nucleic acids, as well as small molecules such as primary metabolites, secondary metabolites, and natural products.

There is currently huge interest in the use of biomolecules (including biopharmaceuticals or biologics) in industry and medicine. Biopharmaceuticals are medicinal products manufactured in, extracted from, or semi-synthesized from biological sources.

Biomolecules of interest in medicine include antibodies (recombinant, native, humanized, polyclonal and monoclonal), therapeutic proteins (such as insulin, growth factors, and therapeutics that address anaemia, rheumatoid arthritis, and cancer), growth factors, vaccines, viruses, virus-like-particles, DNA (plasmid and others) and RNA.

Other biomolecules of interest include dairy nutraceuticals and other high-value proteins such as lactoferrin.

Desirable biomolecules are often obtained by chromatographic separation from a feed stream that contains them. However, chromatographic separation can also be used to remove undesirable biomolecules from complex feed streams, for example, the removal of beta-lactoglobulin from milk or proteolytic proteins from fermentation broths containing recombinantly produced therapeutic proteins.

One disadvantage of standard chromatographic separation techniques is the need to remove even low concentrations of suspended solids from the feed stream, before target analytes can be separated.

For example, biomolecule-containing feed streams often comprise fermentation broths or cell cultures, which contain cell debris and other solids. These suspended solids must first be removed by centrifugation and/or filtration steps to prevent blockage of the chromatographic media through which the feed stream is passed.

These additional processing steps greatly increase both production time and costs.

In addition, centrifugation and/or filtration steps result in loss of overall yield of the target analyte. Where the target analyte is a labile compound, greater processing increases exposure to denaturing conditions (high shear stress and elevated temperatures) and proteases present in the process stream. Consequently, both the activity of the analyte and overall product yield are decreased.

Therefore, there is a need for additional separation media and processes that can be used to separate target analytes, in particular, biomolecules, from feed streams, particular feed streams containing suspended solids.

It is an object of the invention to go at least partway to meeting this need, and/or to at least provide the public with a useful choice.

3. SUMMARY OF INVENTION

The present invention relates generally to hydrogels for use in the separation of analytes from a feed stream containing suspended solids, and methods of separation.

In one aspect the invention provides a separation medium comprising a hydrogel having a structure whose surfaces are defined by a triply periodic minimal surface, the hydrogel comprising at least one ligand that binds at least one target analyte.

In one embodiment, the structure of the hydrogel is selected from the group comprising a Schoen gyroid (gyroid) structure, a Schwarz diamond structure, a Schwartz Primitive structure and a Schoen IWP structure.

In one embodiment, the structure of the hydrogel is a gyroid structure or a Schwarz diamond structure.

In one aspect the invention provides a separation medium comprising a hydrogel of gyroid structure, the hydrogel comprising at least one ligand that binds at least one target analyte.

In the above aspects:

In one embodiment the ligand specifically and/or preferentially binds the at least one target analyte.

In one embodiment the hydrogel is a polysaccharide hydrogel. In one embodiment, the hydrogel is thermoresponsive. Preferably, the hydrogel comprises agarose or cellulose.

In another aspect the invention relates to a chromatographic apparatus comprising a separation medium of the invention. In one embodiment, the chromatographic apparatus is a chromatographic column.

In another aspect the invention relates to the use of a separation medium of the invention to separate at least one target analyte from a feed stream by contacting the separation medium with the feed stream.

In another aspect the invention relates to the use of a separation medium of the invention to separate at least one target analyte from a feed stream by contacting the separation medium with the feed stream under conditions that allow the at least one target analyte to bind the separation medium.

In another aspect the invention relates to the use of a separation medium of the invention to separate at least one target analyte from a feed stream by contacting the separation medium with the feed stream to bind the at least one target analyte to the separation medium.

In another aspect the invention relates to a process for separating at least one target analyte from a feed stream comprising contacting a separation medium of the invention with the feed stream.

In another aspect the invention relates to a process for separating at least one target analyte from a feed stream comprising contacting a separation medium of the invention with the feed stream under conditions that allow the at least one target analyte to bind the separation medium.

In another aspect the invention relates to a process for separating at least one target analyte from a feed stream comprising contacting a separation medium of the invention with the feed stream to bind the at least one target analyte to the separation medium.

In one embodiment the use or process also comprises recovering the at least one target analyte from or bound to the separation medium.

In another aspect, the invention relates to a process for reducing the concentration of at least one target analyte in a feed stream comprising:
(a) contacting a separation medium of the invention with the feed stream, and
(b) recovering the feed stream.

In another aspect, the invention relates to a process for reducing the concentration of at least one target analyte in a feed stream comprising:

(a) contacting a separation medium of the invention with the feed stream under conditions that allow the at least one target analyte to bind the separation medium, and
(b) recovering the feed stream.

In another aspect, the invention relates to a process for reducing the concentration of at least one target analyte in a feed stream comprising:
(a) contacting a separation medium of the invention with the feed stream to bind the at least one target analyte to the separation medium, and
(b) recovering the feed stream.

In another aspect the invention relates to a product made by the process of the invention. In another aspect the invention relates to a product obtained by the process of the invention.

In the above aspects:

In one embodiment the product is a composition containing a target analyte. In another embodiment, the product is a feed stream containing a reduced concentration of a target analyte relative to the feed stream before the feed stream is contacted with the separation medium of the invention.

In one embodiment the feed stream contains suspended solids.

In this specification where reference has been made to patent specifications, other external documents, or other sources of information, this is generally for the purpose of providing a context for discussing the features of the invention. Unless specifically stated otherwise, reference to such external documents is not to be construed as an admission that such documents, or such sources of information, in any jurisdiction, are prior art, or form part of the common general knowledge in the art.

It is intended that reference to a range of numbers disclosed herein (for example, 1 to 10) also incorporates reference to all rational numbers within that range (for example, 1, 1.1, 2, 3, 3.9, 4, 5, 6, 6.5, 7, 8, 9 and 10) and also any range of rational numbers within that range (for example, 2 to 8, 1.5 to 5.5 and 3.1 to 4.7) and, therefore, all sub-ranges of all ranges expressly disclosed herein are hereby expressly disclosed. These are only examples of what is specifically intended and all possible combinations of numerical values between the lowest value and the highest value enumerated are to be considered to be expressly stated in this application in a similar manner.

To those skilled in the art to which the invention relates, many changes in construction and differing embodiments and applications of the invention will suggest themselves without departing from the scope of the invention as defined in the appended claims. The disclosures and the descriptions herein are purely illustrative and are not intended to be in any sense limiting.

4. BRIEF DESCRIPTION OF THE FIGURES

FIG. 1 is a series of pictures depicting: (a) and (b) examples of two different gyroid structures (c) a gyroid structure with changing porosity caused by branching of the flow paths; (d) a double gyroid structure comprising two independent flow channels and a single solid-phase; (e) a gyroid structure comprising two independent flow channels with uniform diameter and three independent solid-phase materials.

Figure 4:
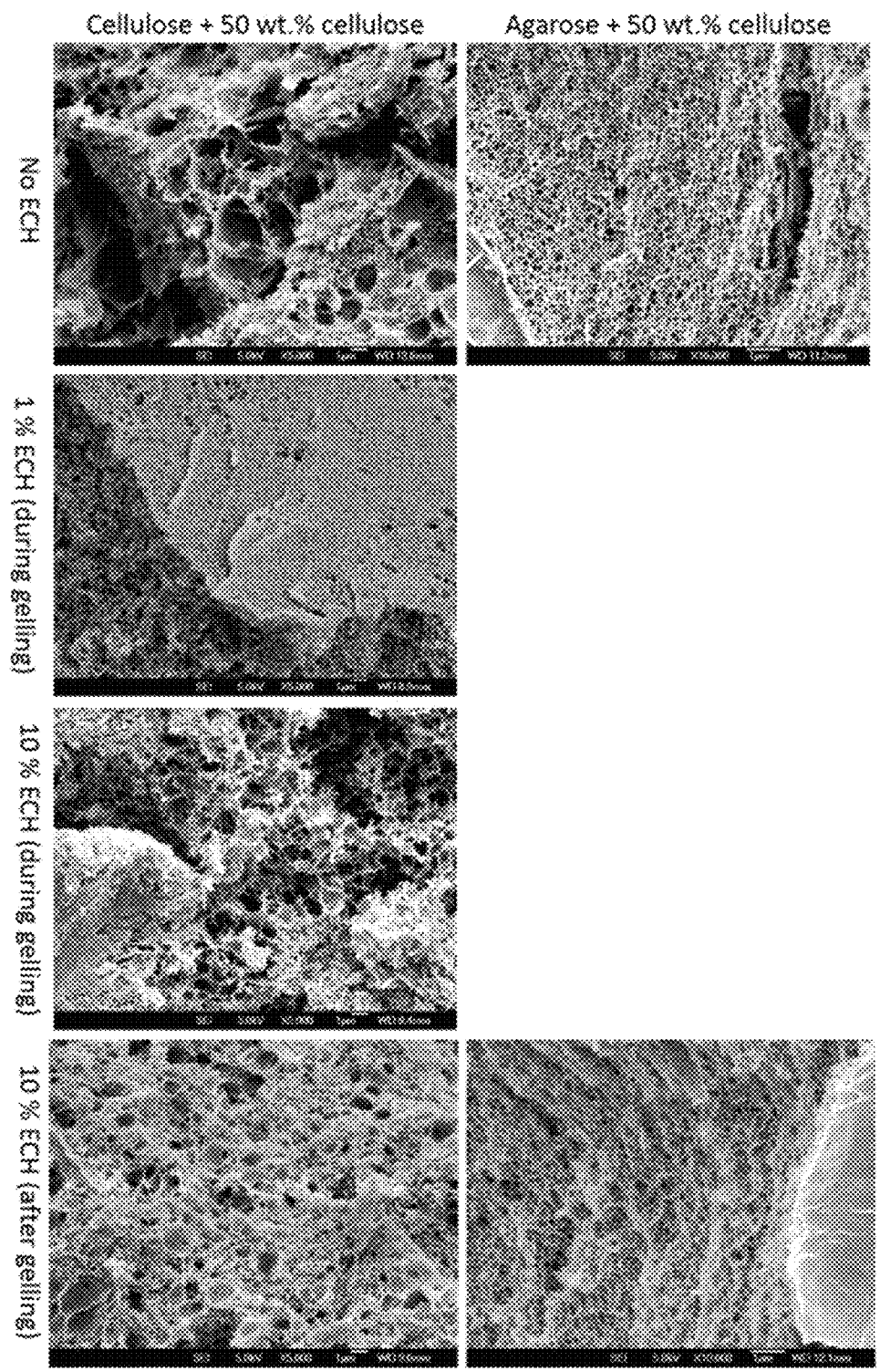

FIG. 4 is a series of SEM micrographs of cellulose and agarose-based gels with 50% added cellulose powder and various levels of chemical cross-linking. The gels are shown after storage in acetone, followed by storage in water and subsequent freeze drying. The micrographs show the internal porosity of the hydrogels, not the channels of the gyroid structure.

Figure 5:
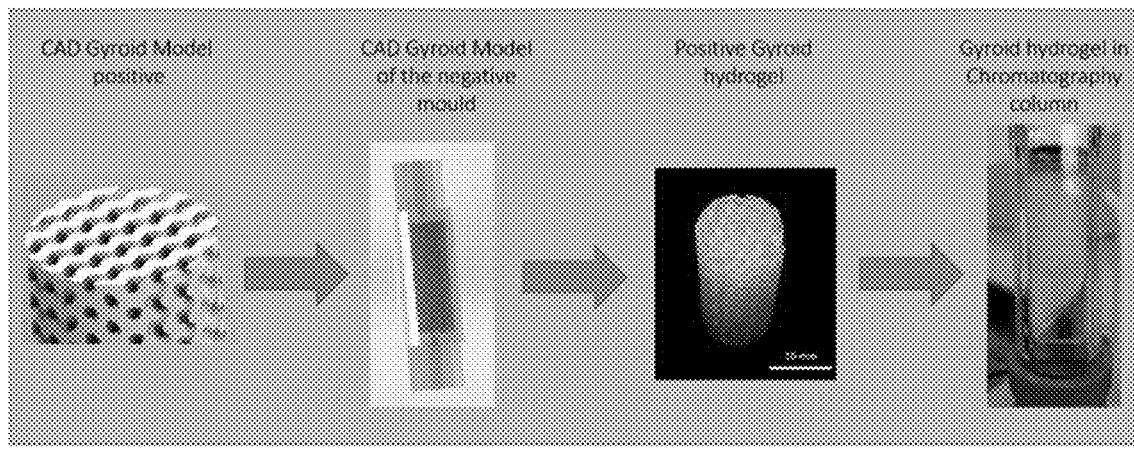

FIG. 5 is a diagram showing the process of preparing a separation medium of the invention.

Figure 6:
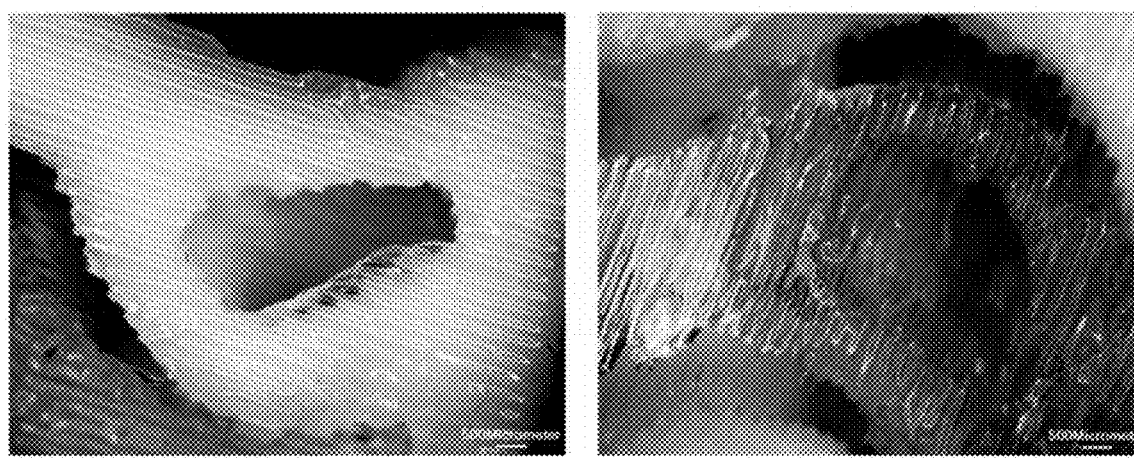

FIG. 6 is two optical micrographs of separation media of the invention showing the channels of the gyroid structure.

Figure 7:
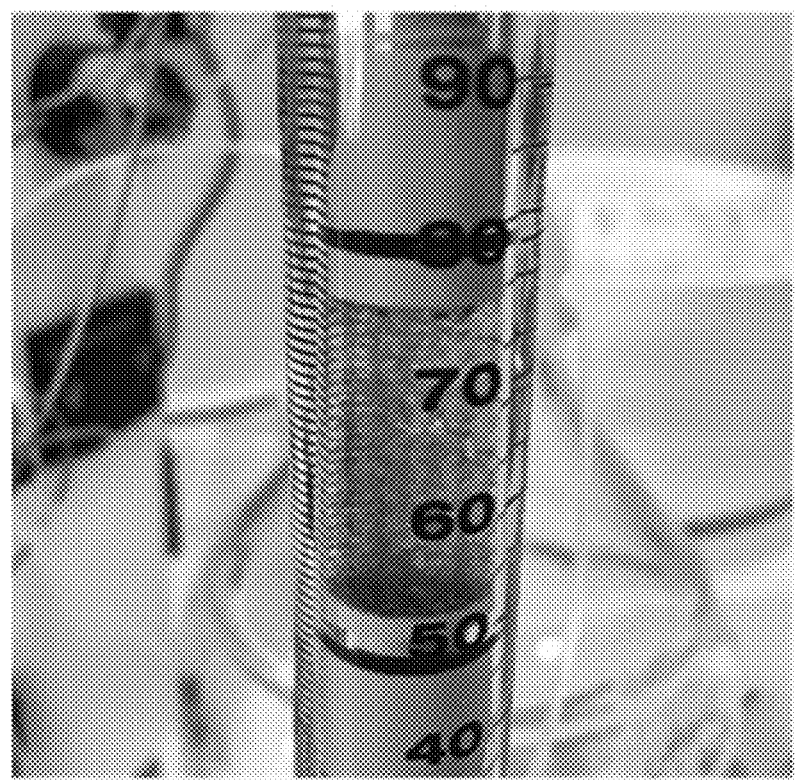

FIG. 7 is a picture of a chromatographic apparatus (Snap column) comprising an agarose gyroid structure in Snap column, with bound cytochrome C giving the red colour. Snap is the registered trademark of "essential Life Solutions Ltd", 308 Tosca Drive, Stoughton, Mass. 02072.

Figure 8:
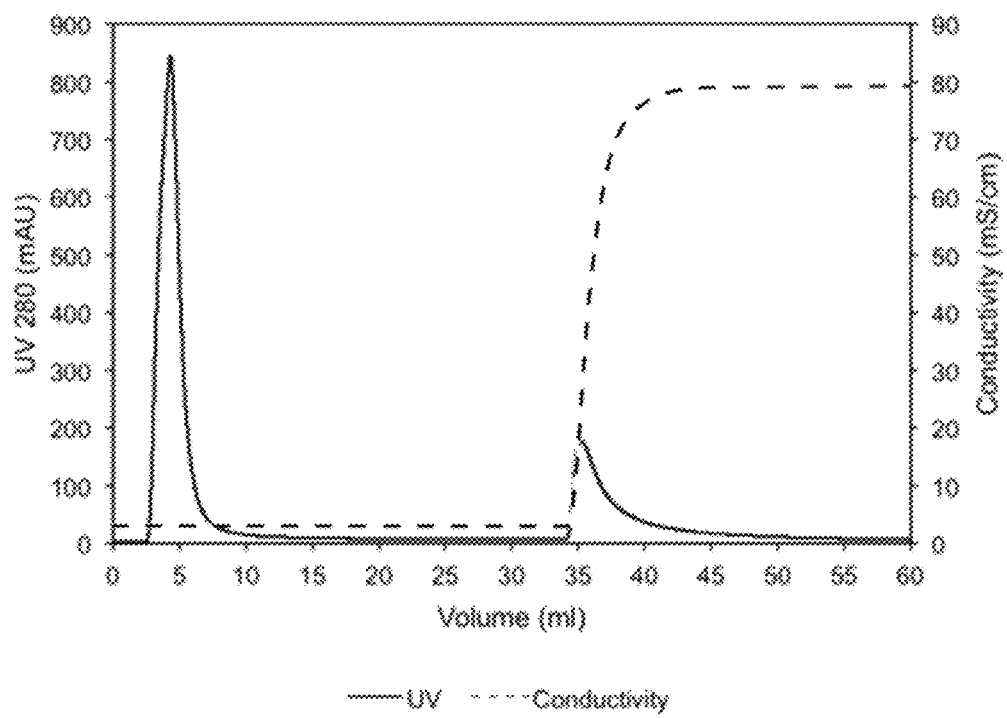

FIG. 8 is a chromatogram showing separation of cytochrome C from BSA and yeast cells.

Figure 9:
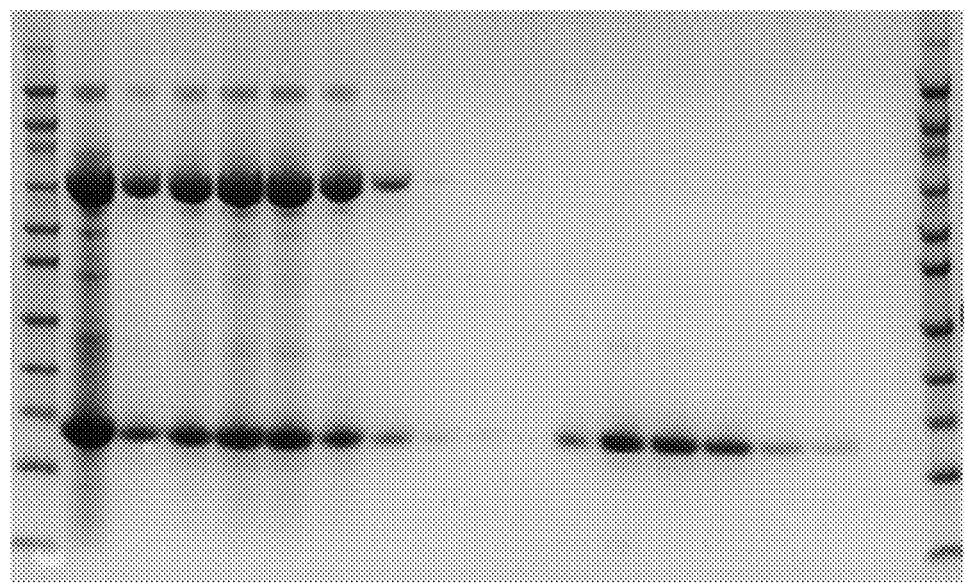

FIG. 9 shows SDS PAGE gel of fractions collected from chromatographic analysis. 1: Load sample. 2-10: flow-through peak. 11-17: Elution peak. L: Ladder of Novex Sharp Protein Standard.

Figure 10:
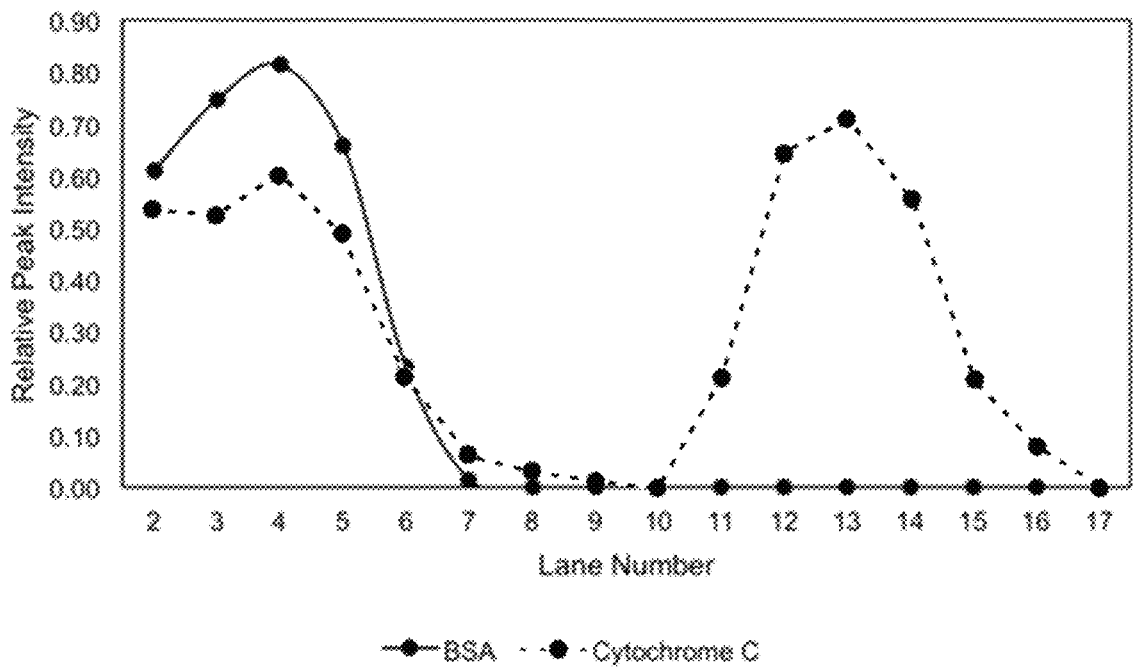

FIG. 10 is a graph showing the relative band intensities for BSA and cytochrome C bands on the gel from lanes 2-17.

Figure 11:
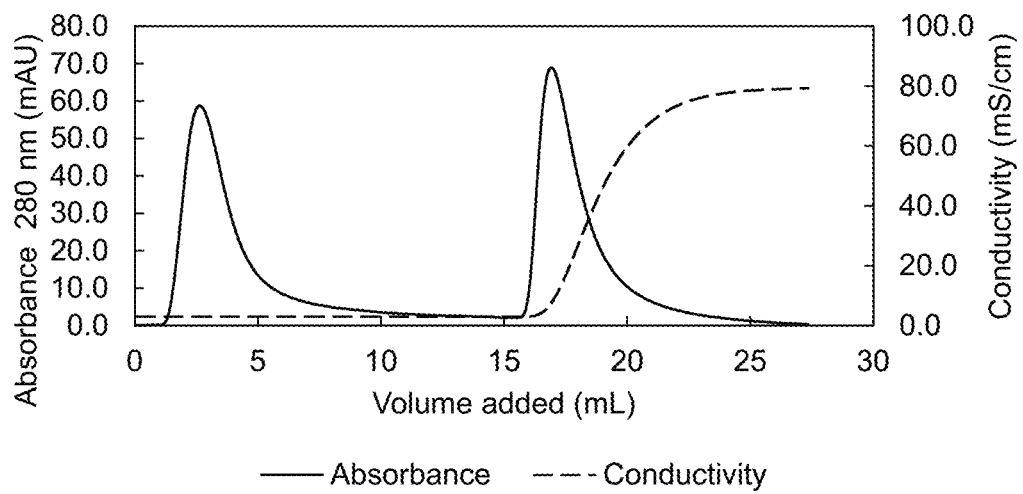

FIG. 11 is a chromatogram showing the separation of 2.5 mg/ml BSA loaded onto a DEAE agarose column of the invention, as described in Example 4.

Figure 12:
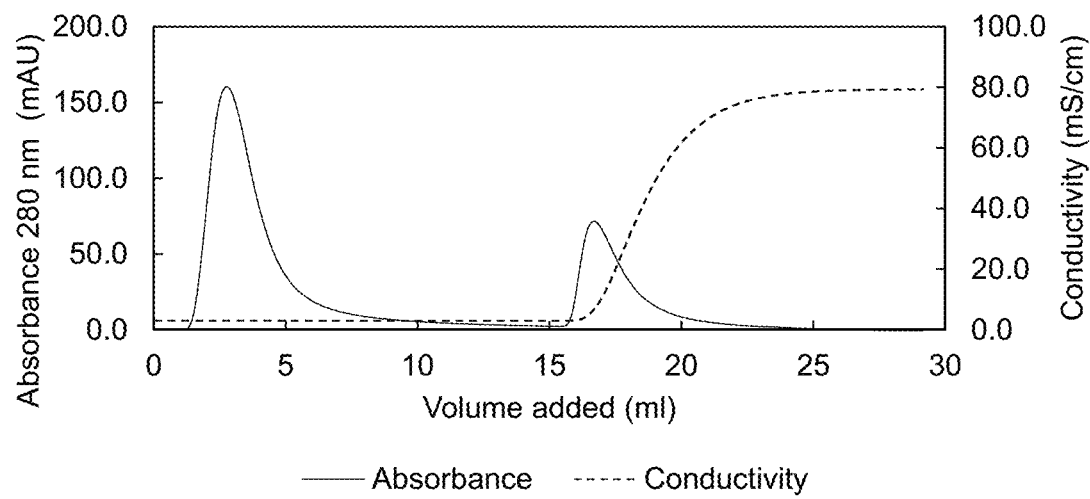

FIG. 12 is a chromatogram showing the separation of 2.5 mg/ml BSA and 1.0 mg/ml cytochrome C loaded onto DEAE agarose column, as described in Example 4.

Figure 13:
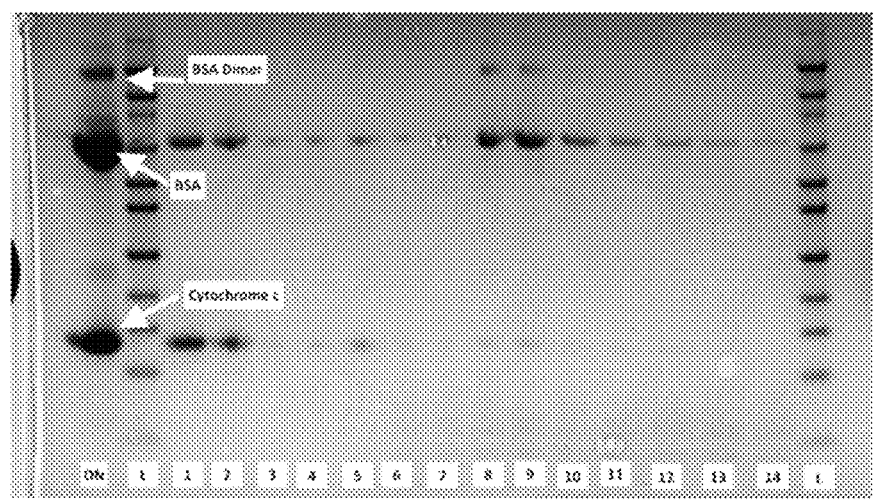

FIG. 13 is an SDS PAGE gel of BSA and cytochrome C fractions where ON=on sample: L=ladder: 1-2=flow through peak; 3-7=wash unbound sample: 8-14=elution.

Figure 14:
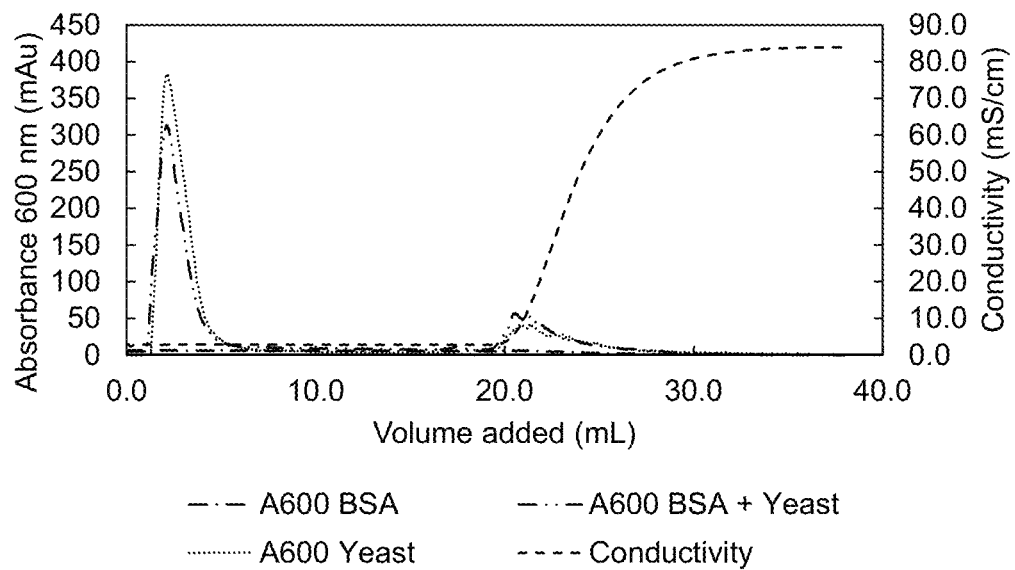

FIG. 14 is a chromatogram at 600 nm absorbance of BSA, yeast, yeast+BSA samples loaded onto the agarose DEAE column.

Figure 15:
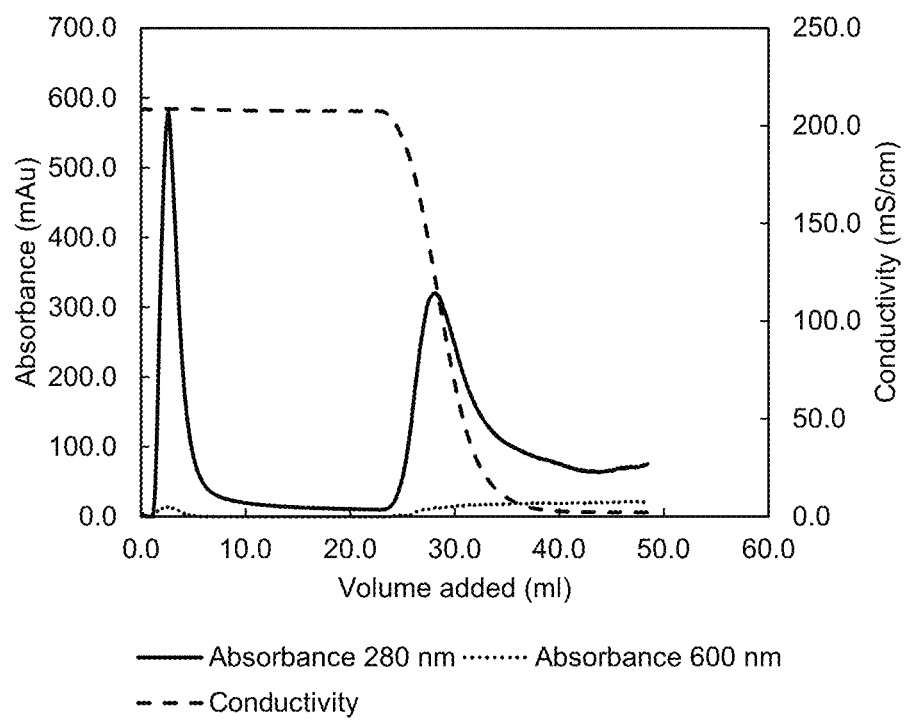

FIG. 15 is a chromatogram of α-lactalbumin on a benzylamine agarose column. Absorbance at 280 nm and 600 nm was analysed, with 100% elution buffer added in single step.

Figure 16:
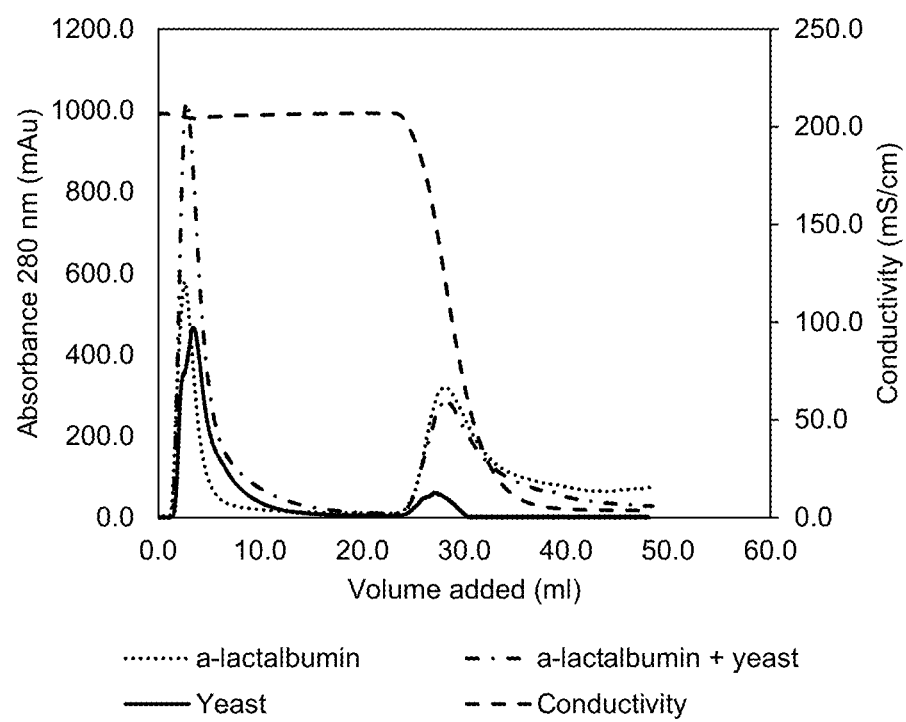

FIG. 16 is a chromatogram showing absorbance at 280 nm for trials on a benzylamine agarose column for capture of α-lactalbumin, yeast only, and α-lactalbumin in the presence of yeast.

Figure 17:
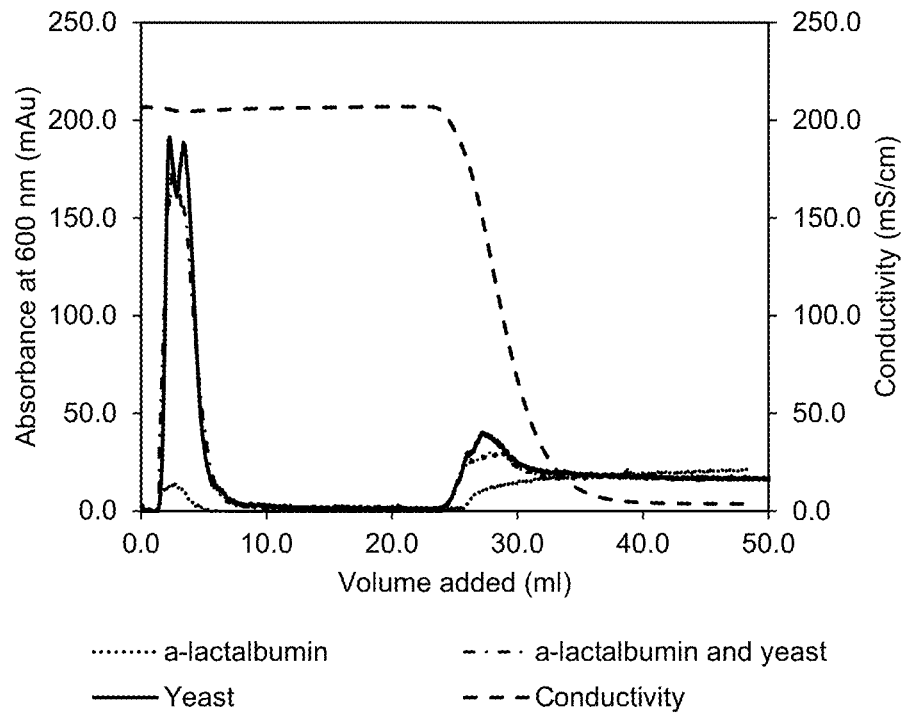

FIG. 17 is a chromatogram showing absorbance at 600 nm for trials on a benzylamine agarose column for capture of α-lactalbumin, yeast only, and α-lactalbumin in the presence of yeast.

Figure 18:
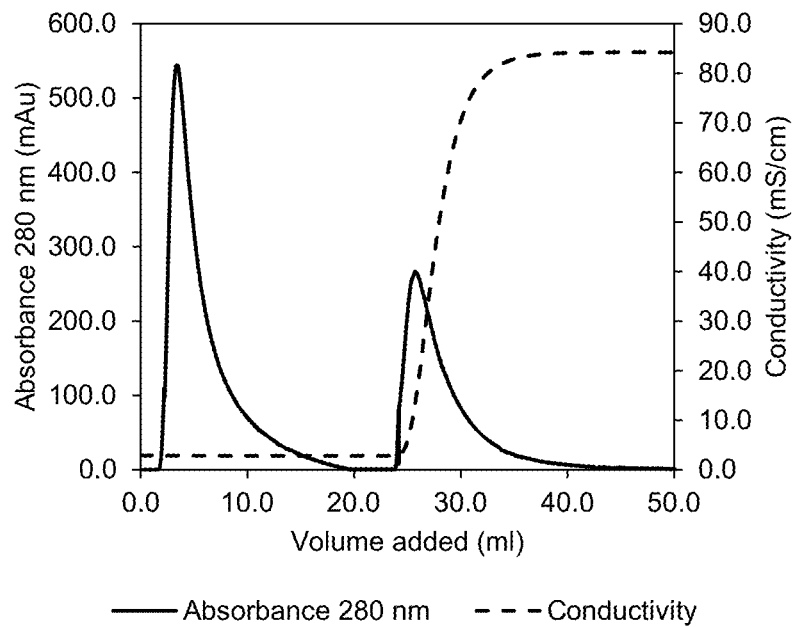

FIG. 18 is a chromatogram of cytochrome C binding on a Schwarz D cation exchanger.

Figure 19:
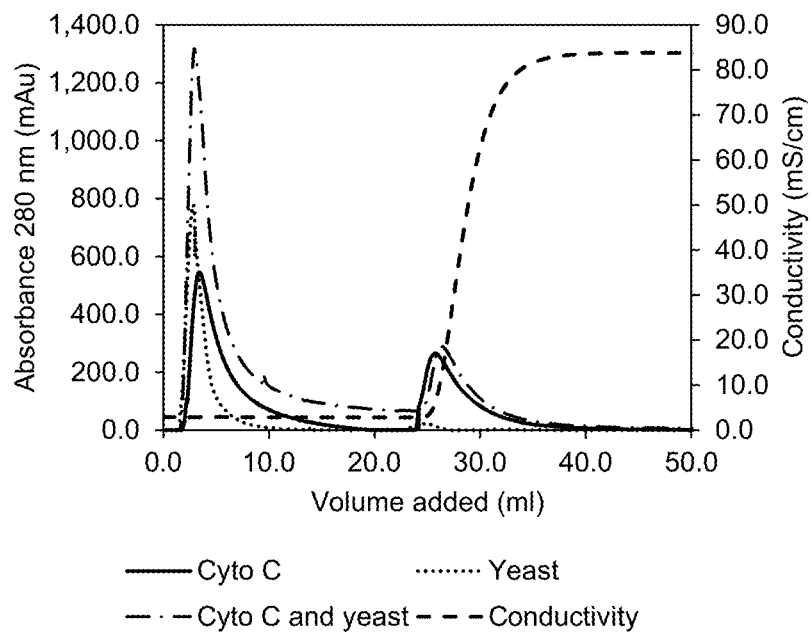

FIG. 19 is a chromatogram of UV absorbance at 280 nm for cytochrome C, yeast, and cytochrome C plus yeast on a Schwarz D agarose cation exchanger.

Figure 20:
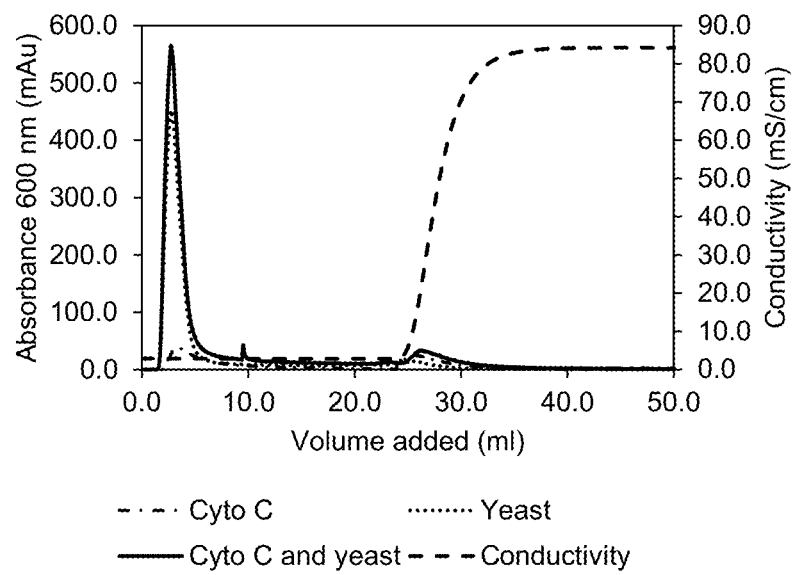

FIG. 20 is a chromatogram of UV absorbance at 600 nm for cytochrome C, yeast, and cytochrome C plus yeast on a Schwarz D agarose cation exchanger.

Figure 21:
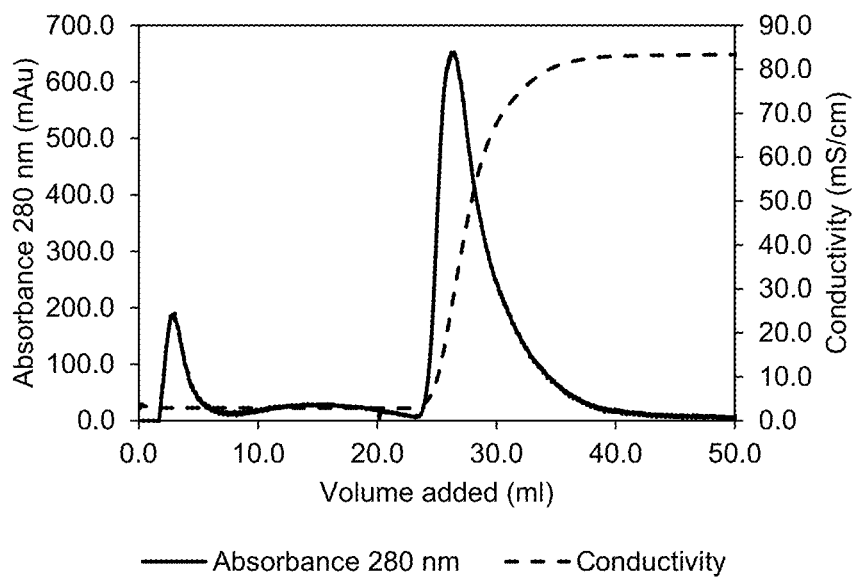

FIG. 21 is a chromatogram of cytochrome C binding on a Schoen Gyroid cellulose cation exchanger.

Figure 22:
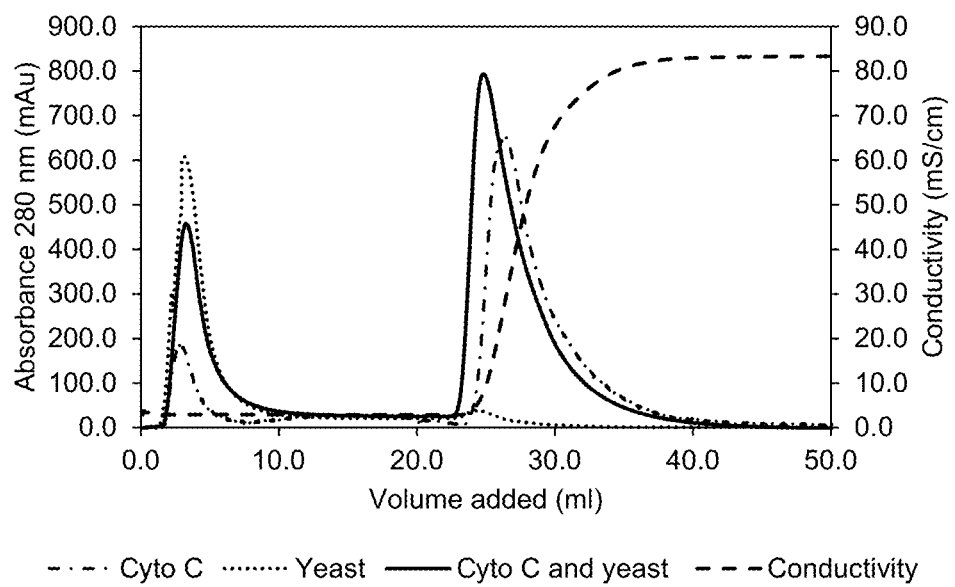

FIG. 22 is a chromatogram of UV absorbance at 280 nm for cytochrome C, yeast, and cytochrome C plus yeast on a Schoen Gyroid cellulose cation exchanger.

Figure 23:
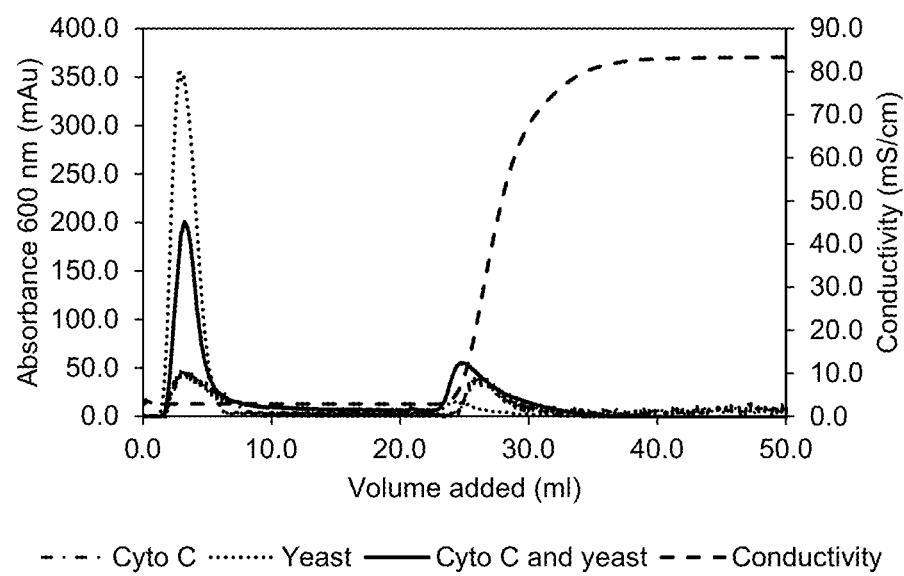

FIG. 23 is a chromatogram of UV absorbance at 600 nm for cytochrome C, yeast, and cytochrome C plus yeast on a Schoen Gyroid cellulose cation exchanger.

5. DETAILED DESCRIPTION OF INVENTION

5.1 Definitions

The term 'comprising' as used herein means 'consisting at least in part of'. When interpreting statements in this specification and claims which include the term 'comprising', other features besides the features prefaced by this term in each statement can also be present. Related terms such as 'comprise' and 'comprised' are to be interpreted in similar manner.

The term "porosity" as used herein means void fraction or void space and is the fraction of the volume of the total voids over the total volume, expressed as a percentage.

The term "analyte" is used herein as know and understood by the person of ordinary skill in the art and refers to a compound, substance or chemical constituent that is of interest. Preferably the analyte is a biomolecule.

The term "non-target analyte" as used herein as know and understood by the person of ordinary skill in the art and refers to a compound, substance or chemical constituent that is not of interest. For example, a non-target analyte could be a protein, nucleic acid, lipid or other cellular constituent in a cell culture or cell lysate. The non-target analyte is intended to pass through a separation medium of the invention without binding to the separation medium, or to bind the separation medium with a lower specificity or lower binding affinity than a target analyte so that the non-target analyte may be removed from the separation medium using elution or wash conditions that are readily determined by the skilled worker, but not limited thereto.

The term "binding" as used herein refers to the adherence between two substances and includes covalent bonding, hydrogen bonding, Van der Waals' forces, polar or electrostatic forces and ionic bonding. The two substances are usually referred to as the molecules present in solution (mobile phase) and the ligand present on the chromatographic matrix (solid phase).

The term "preferentially binds" as used herein with reference to a ligand and target analyte means that the target analyte binds to the ligand with greater efficiency than non-target analytes.

The term "specifically binds" as used herein with reference to a ligand and target analyte, means that only the target analyte binds to the ligand.

The term "under conditions that allow the target analyte to bind" as used herein refers to conditions of the mobile phase in terms of its pH, ionic strength, composition, temperature, viscosity and density that allow interactions between the analyte and the ligand.

The term "binding affinity" as used herein refers to the affinity of an analyte for binding to a ligand. Various means of detecting the binding affinity of a given analyte-ligand pair are known in the art. It is believed that a person of skill in the art can use such means to determine the binding affinity of an analyte for a ligand as a routine matter.

The term "triply periodic minimal surface" as used herein means that a small piece of the surface may be used to assemble the entire surface by taking a fundamental piece and translating copies in three independent directions in space.

5.2 The Separation Medium of the Invention

Direct separation of target analytes from feed streams containing suspended solids requires a separation medium that provides adequate surface area for analyte binding, while allowing suspended solids to pass freely.

A major disadvantage of known separation techniques is the need to pre-treat or pre-filter feed streams before many analytes of interest may be recovered using currently available methods.

The inventors have surprisingly found that the separation medium that achieves the best flow pattern of the mobile phase while still retaining a target analyte is a hydrogel phase having a structure whose surfaces are defined by a triply periodic minimal surface, in particular, a Schoen gyroid structure.

Figure 1:
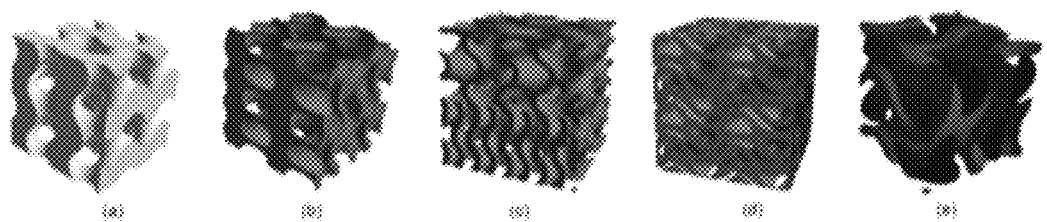

The surfaces of a Schoen gyroid structure are defined by a complicated mathematical formula that can be approximated by the expression:

$$\sin(x)\cos(y)+\sin(y)\cos(z)+\sin(z)\cos(x)=G$$

where x, y and z are the locations of points within the media in a Cartesian coordinate system and G is an arbitrary constant. When the "=" sign is substituted by the "<" sign, than the expression will identify two separate regions in the space, whose interface is defined by the original equation above. The two regions are then identified as the porous solid and the void (flow channels). The arbitrary constant G is an arbitrary constant that determines the relative volume fractions of the solid and void (flow channel) portions within the geometry of the media. A range of gyroid structures can be prepared by changing the constants and functions of this equation. Non-limiting examples are provided in FIG. 1.

Accordingly, the separation medium of the invention comprises a hydrogel of gyroid structure, the hydrogel comprising at least one ligand that binds a target analyte.

A hydrogel of gyroid structure provides sufficient contact between the ligands of the solid phase and the analytes in the mobile phase to effect binding, while allowing the passage of suspended solids.

In one embodiment, the gyroid structure is defined by the equation $$\sin(x)\cos(y)+\sin(y)\cos(z)+\sin(z)\cos(x)<G$$

where x, y and z are the locations of points within the media in a Cartesian coordinate system and G is between −1.413 and 1.413, preferably between about −1.4 to about 1.4, more preferably between about −0.5 to about 0.5. The inequality indicates that the solid phase is printed at coordinates x, y and z within the volume defined where the left hand side of the equation is less than G, leaving positions where the left hand side is equal to or greater than G will comprise the flow channels (mobile phase).

In one embodiment G is 0.

In one embodiment, the interconnected channels through the hydrogel that define the gyroid structure are about 5 to about 500 mm diameter, preferably about 10 to about 250 μm in diameter.

Other types of triply periodic minimal surface can be defined and used as geometries in the invention. Another type of triply periodic minimal surface is the Schwartz Primitive geometry, defined by the equation $$\cos(x)+\cos(y)+\cos(z)<G$$

where x, y, z and G are as defined above.

Another type of triply periodic minimal surface is the Schwartz Diamond geometry, defined by either of the two following equations $$\cos(x)\cos(y)\cos(z)-\sin(x)\sin(y)\sin(z)<G$$

or $$\sin(x)\sin(y)\sin(z)+\sin(x)\cos(y)\cos(z)+\cos(x)\sin(y)\cos(z)+\cos(x)\cos(y)\sin(z)<G$$

where x, y, z and G are as defined above.

Another type of triply periodic minimal structure is the Schoen IWP geometry, defined by the equation $$2[\cos(x)\cos(y)+\cos(x)\cos(z)+\cos(y)\cos(z)]-[\cos(2x)+\cos(2y)+\cos(2z)]<G$$

where x, y, z and G are as defined above.

Gyroids structures occur naturally (e.g. butterfly wings, mitochondrial membranes, block co-polymers and water-lipid phases), but only form naturally at the nanoscale and under highly specific conditions. The present invention relates to hydrogels having a gyroid or other triply periodic structure at the micro-scale.

Hydrogels are characterised by an internal porosity with pore sizes in the nanometer range (<1 μm). These internal pores are of much smaller magnitude than the geometrical features of the gyroid structure which has pore and/or channel sizes in the micrometre range, i.e., on the micro scale.

In one embodiment, the chromatographic medium of the invention comprises a hydrogel having a structure whose surfaces are defined by a triply periodic minimal surface, with a porosity of about 10 to about 90%, preferably about 50 to about 90%, more preferably about 30 to about 70%.

In one embodiment, the chromatographic medium of the invention comprises a hydrogel of gyroid structure with a porosity of about 10 to about 90%, preferably about 50 to about 90%, more preferably about 30 to about 70%.

The term "gyroid structure" or "Schoen gyroid" includes structures in which two independent networks of gyroid shaped channels are separated by a solid phase, or vice versa.

The separation medium of the invention offers perfectly controlled flow portions not limited by particle geometry or random packing procedures. A separation medium comprising a hydrogel having a structure whose surfaces are defined by a triply periodic minimal surface, allows rapid chromatographic processing of large volume feed streams containing suspended solid particles, without the need for pre-processing. In one embodiment the hydrogel is of gyroid structure.

This is due to a combination of features including (a) the high free volume in the channels for passage of the solid-laden feed, (b) the high surface area of the solid-phase (i.e. high adsorptive capacity for the target analyte), (c) uniform path lengths for diffusion in the mobile and solid phases throughout the entire length of the medium, and (d) no dead end zones and minimal recirculation areas which minimizes contamination risks and reduces cleaning in place requirements.

These properties mean that pressure drops are reduced, the structure is mechanically stabile under high shearing conditions, and solid/liquid contact is improved.

In one aspect, the invention provides a separation medium comprising a cellulose or agarose hydrogel having a structure whose surfaces are defined by a triply periodic minimal surface, wherein the channels of the structure are about 5 to about 500 μm diameter and the hydrogel has a porosity of about 50 to about 90%, the hydrogel comprising at least one ligand that binds at least one target analyte.

In one aspect, the invention provides a separation medium comprising a cellulose or agarose hydrogel of gyroid structure, wherein the channels of the gyroid are about 5 to about 500 μm diameter and the gyroid structure has a porosity of about 50 to about 90%, the hydrogel comprising at least one ligand that binds at least one target analyte.

5.3 Preparation of the Separation Medium of the Invention

The separation medium of the invention is made by setting a hydrogel-forming solution into a hydrogel of gyroid structure. The choice of hydrogel depends of the manner in which the gyroid structure will be achieved, as some hydrogels are more suited to particular shaping techniques.

In one embodiment, the separation medium is prepared using negative templating in which a conventional 3D-printer makes a mould of the negative of the desired gyroid structure using plastic or other suitable material. Acrylonitrile butadiene styrene (ABS) is preferred. The mould is then infused with a hydrogel-forming solution which is then gelled to form the solid hydrogel. The template is then readily dissolved with (for ABS) acetone, leaving behind the hydrogel medium with the desired 3D structure. This material can be inserted into a chromatographic column for use in separating target analytes from feed streams containing suspended solids.

The resolution of this technique is limited only to the resolution achievable by the 3D printer used to make the mould. Therefore, the size, tortuosity and thickness of walls and channels, can all be varied at will. In addition, hydrogels comprising multiple, independent flow channels can be prepared, and porosity may be varied within the same separation medium.

The relative orientation of the gyroid geometry with respect to the main axis of the flow in the channels can either be such as to offer preferential axial (or near-axial) flow through pores, or can be at an angle to the axis to favour interconnection of the different flow paths, or any other intermediate relative orientation.

Figure 2:
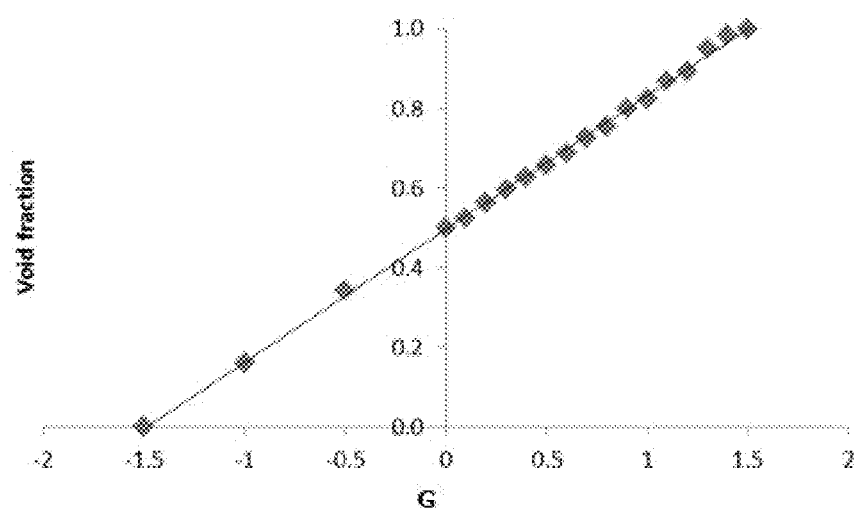
FIG. 2 is a graph showing the relationship between porosity and constant G for a gyroid structure defined by $\sin(x)\cdot\cos(y)+\sin(y)\cdot\cos(z)+\sin(z)\cdot\cos(x)<G$.

For example, for the simplest gyroid structure (all constants equal to 1 except G):

$$\sin(x)\cdot\cos(y)+\sin(y)\cdot\cos(z)+\sin(z)\cdot\cos(x)<G$$

the porosity can be simply tuned by changing the G constant (see FIG. 2).

For this gyroid structure the relationship between void fraction and the constant G can be approximately with a linear relationship (within the range $-1.413<G<1.413$), but other relationships are in order for other parameters (e.g. surface area, pore size, etc.). Also, these relationships will be different if the gyroid structure is defined by a different form of the base equation.

The negative templating method is particularly suited to preparation of thermoresponsive hydrogels. Thermoresponsive hydrogels are made from hydrogel-forming solutions which can be gelled simply by changing their temperature.

For example, a cellulose-based hydrogel can be prepared by infusing a cellulose solution into a negative template at low temperature (below 4° C.) then thermally gelling the material by raising the temperature (to around 60° C. or greater). Cellulose solutions can be made by dissolving cellulose (5-7 wt %) in a combination of NaOH or LiOH with urea, thiourea or polyethyleneglycol (PEG), in particular NaOH/urea. After thermogelling, the NaOH and urea can be washed out to regenerate the cellulose hydrogel.

An agarose hydrogel can be prepared by infusing an agarose solution into a negative template at elevated temperature (around 80° C.) and then gelling by lowering the temperature below 45° C.

Figure 3:
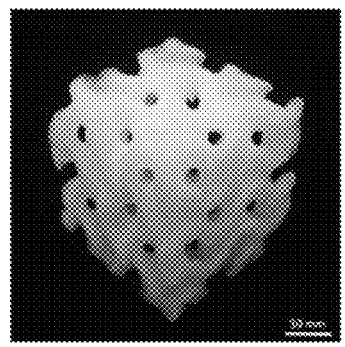
FIG. 3 is a picture of a 3D printed gyroid monolith defined by $\sin(x)\cdot\cos(y)+\sin(y)\cdot\cos(z)+\sin(z)\cdot\cos(x)<0$.

FIG. 3 shows a cellulose hydrogel gyroid structure prepared using the negative templating technique.

The physical structure of the hydrogels can be can modified to achieve particular desired properties (e.g. average pore size, thickness of the pore walls, porosity, etc.) by the addition of physical cross-linkers. Additives used for physical cross-linking include but are not limited to microcrystalline cellulose, nanocellulose, bacterial cellulose, chitin, chitosan and other non-soluble carbohydrates. For example, additional cellulose can be added to a saturated cellulose solution in preparation of a cellulose hydrogel. Upon gelation/regeneration, this material acts as a reinforcing phase providing the hydrogel with improved strength and stiffness.

The physical structure of the hydrogel can also be modified by the addition of a chemical cross-linker to create a stiffer gel. Additives used for chemical cross-linking include but are not limited to epichlorohydrin (ECH), glutaraldehyde and the like. A person skilled in the art can manipulate the degree of cross-linking to affect physical properties of the gel including but not limited to elongation at break, maximum compression load at break, elastic modulus, creep resistance, average nanopore dimensions, micropore size distribution and total surface area.

FIG. 4 shows SEM micrographs of a range of hydrogels of the invention containing different cross-linkers and different concentrations.

Changing the medium used for regeneration of the hydrogel (e.g. alcohol, acetone, sulfuric acid) may also affect its properties, for example, by shrinking or swelling the hydrogel.

To be used as a separation medium, the hydrogel must be functionalised by the introduction of at least one ligand that will bind a target analyte.

In one embodiment, the polymers reacted to produce the hydrogel are functionalised with the ligand before formation. In another embodiment, the hydrogel is functionalised with the ligand after formation. Techniques for ligand functionalisation of hydrogels are well known in the art.

Ligands comprise a functional group suitable for binding to the target analyte. The functional group required depends on the type of chromatography used.

Ligands that will bind a target analyte include but are not limited to ligands for use in affinity chromatography, ion exchange chromatography, hydrophobic interaction chromatography, multimodal chromatography or gel permeation chromatography.

For anion exchange chromatography (to reversibly adsorb negatively charged biomolecules) the functional group of the ligand may be selected from amines, quaternary amines, diethylamine (DEAE) and others. For cation exchange chromatography (to capture positively charged biomolecules) the functional group of the ligand may be selected from carboxyl, sulphonic acid and others.

For affinity chromatography, the ligand may comprise Protein A, Protein L, Protein G and others to capture immunoglobulins. The functional group iminodiacetic acid (IDA) is present on ligands used for metal affinity chromatography to capture His-tagged proteins by first loading the IDA with multi-valent metal ions such as nickel or copper. Other specific affinity ligands may be used for specific binding of other target analytes.

For hydrophobic interaction chromatography, ligands include functional groups such as, but not limited to, alkyl chains (butyl, octyl), phenyl and benzylamine groups.

In one embodiment the ligand is selected from the group consisting of a small molecule, a cation, an anion, a charged or uncharged polymer, a hydrophobic moiety, a biomimetic ligand, a multimodal ligand, a protein, a peptide, a nucleic acid, an antibody or antigen binding fragment thereof.

Before the ligand can be attached to the hydrogel, the hydrogel must be activated by introduction of a reactive group. In one embodiment, the hydrogel is activated by 1,1'-carbonydiimadzaole (CDI) activation. Other carbonylating reagents can also be used, for example 1,1'-carbonyldi-1,2,4-viazole (CD5), 1,1'-carbonyl-1,2,3-benzotrizazole (CDB).

In CDI activation, hydroxy groups in the hydrogel polymers react with 1,1'-carbonydiimidazole to form an N-alkylcarbamate which then reacts with N-nucleophiles present in the ligand to provide the ligand comprising the reactive group.

While the internal channels of the hydrogel are of a structure whose surfaces are defined by a triply periodic minimal surface, the external shape of the separation medium of the invention can be any shape suitable for use in chromatography including but not limited to, a sheet or membrane, strand, plug, disc, monolith, cylinder, cylindrical annulus or bead. The desired shape will depend on the type of chromatographic apparatus in which the medium is to be used.

In another aspect the invention provides a chromatographic apparatus comprising a separation medium of the invention. In one embodiment, the chromatographic apparatus is a chromatographic column. In one embodiment, the column includes an associated cartridge to enable connection to a chromatographic set up such as a Fast Protein Liquid Chromatography (FPLC) apparatus or High Performance Liquid Chromatography (HPLC) apparatus.

FIG. 5 shows the process of negative templating to produce a separation medium comprising a cylindrical hydrogel of gyroid structure, which is inserted into a chromatography column for use. FIG. 6 shows the channels of the gyroid structure of the separation medium of the invention.

5.4 The Separation Process of the Invention

The inventors have found that by using the separation medium described herein, a target analyte can be effectively separated or removed from a feed stream. The inventors believe that the separation medium of their invention has broad application in many industries for the separation or removal of various analytes from feed streams where pretreatment of the feed stream may be costly and/or time consuming, and particularly from feed streams comprising suspended solids.

Accordingly, in one aspect the present invention relates to the use of a separation medium of the invention to separate at least one target analyte from a feed stream comprising contacting the separation medium with the feed stream.

In another aspect the invention relates to the use of a separation medium of the invention to separate at least one target analyte from a feed stream comprising contacting the separation medium with the feed stream under conditions that allow the at least one target analyte to bind the separation medium.

In another aspect the invention relates to the use of a separation medium of the invention to separate at least one target analyte from a feed stream comprising contacting the separation medium with the feed stream to bind the at least one target analyte to the separation medium.

In another aspect the invention relates to a process for separating at least one target analyte from a feed stream comprising contacting a separation medium of the invention with the feed stream.

In another aspect the invention relates to a process for separating at least one target analyte from a feed stream comprising contacting a separation medium of the invention with the feed stream under conditions that allow the at least one target analyte to bind the separation medium.

In another aspect the invention relates to a process for separating at least one target analyte from a feed stream comprising contacting a separation medium of the invention with the feed stream to bind the at least one target analyte to the separation medium.

In the above aspects:

In one embodiment the use or process optionally comprises recovering the at least one target analyte from the separation medium.

In one embodiment of the use or process, the separation or removal of the analyte is carried out without pre-treatment of the feed stream to remove suspended solids.

In one embodiment of the use or process, contacting comprises passing the feed stream through, or at least partially through, the separation medium.

In one embodiment of the use or process the feed stream contains suspended solids.

In one embodiment of the use or process, the separation medium is contacted with the feed stream under conditions that allow the at least one target analyte to bind the separation medium. In one embodiment the at least one target analyte specifically binds a ligand comprised in the separation medium.

Conditions that allow the at least one target analyte to bind the separation medium comprise, but are not limited to adjusting the pH, salinity, conductivity, or temperature of the feed stream. In some embodiments, the feed stream is under conditions that allow the at least one target analyte to bind the separation medium.

In other embodiments, the conditions that allow the at least one target analyte to bind the separation medium may be adjusted to modulate the binding interaction. For example, the conditions of the feed stream may be altered to increase or decrease the binding of the at least one target analyte to the separation medium.

In one embodiment of the use or process contacting comprises contacting the separation medium with the feed stream to bind the at least one target analyte to the separation medium.

In one embodiment of the use or process the at least one target analyte preferentially binds the separation medium. In one embodiment of the use or process, the at least one target analyte specifically binds to the separation medium. Preferably the target analyte preferentially binds or specifically binds a ligand bound to the separation medium.

In one embodiment of the use or process the ligand bound to the separation medium is comprised in the hydrogel of the separation medium.

In one embodiment of the use or process, the ligand is an ion exchange ligand, preferably cationic exchange ligand. In one embodiment the ligand is selected from the group comprising 6-aminohexanoic acid, 7-aminohexanoic acid and 8-aminohexanoic acid.

In another embodiment, the ligand is a hydrophobic interaction ligand. In one embodiment of the use or process the ligand is exposed on the surfaces of pores and/or channels of the hydrogel that form the surfaces defining the gyroid structure of the hydrogel.

In one embodiment of the use or process the feed stream contains suspended solids. In one embodiment of the use or process the feed stream contains at least one non-target analyte. In one embodiment of the use or process the feed stream contains at least two, preferably at least three, preferably at least 4, preferably at least 5 or more non-target analytes. In one embodiment of the use or process the feed stream has not been pre-treated to remove non-target analytes.

In one embodiment of the use or process the at least one target analyte is separated from the feed stream by chromatographic separation. In one embodiment of the use or process the chromatographic separation comprises affinity, ion-exchange, hydrophobic interaction, multimodal or gel permeation chromatography. Preferably the chromatographic separation comprises ion-exchange, affinity or multimodal chromatography.

In one embodiment of the use or process the at least one target analyte comprises a biomolecule.

In one embodiment of the use or process the at least one target analyte comprises an analyte selected from the group consisting of a biomolecule, a protein; a protein fragment; a peptide including an oligopeptide and an oligopeptide fragment; a polypeptide; a polypeptide fragment; an antibody binding domain; an antigen; an antigen fragment; an antigenic determinant; an epitope; a hapten; an immunogen; an immunogen fragment; an inhibitor; a co-factor; a substrate; an enzyme; a receptor; a receptor fragment; a receptor subunit; a receptor subunit fragment; a ligand; a receptor ligand; a receptor agonist; a receptor antagonist; a signalling molecule; a signalling protein; a signalling protein fragment; a monosaccharide; an oligosaccharide; a polysaccharide; a glycoprotein; a lipid; a cell; a cell-surface protein; a cell-surface lipid; a cell-surface carbohydrate; a cell-surface glycoprotein; a cell extract; a virus; a virus coat protein; a steroid; a hormone; a steroid hormone; a serum protein, a small molecule, and a macromolecule; and any combination thereof.

In one embodiment of the use or process the target analyte is a cytochrome, preferably cytochrome C, or α-lactalbumin.

In one embodiment of the use or process the feed stream is a biological fluid or a non-biological fluid.

In one embodiment of the use or process the biological fluid is selected from the group consisting of blood, urine, serum, saliva, milk, whey and semen.

In one embodiment of the use or process the non-biological fluid comprises biomolecules. In one embodiment the non-biological fluid is selected from the group consisting of a cell suspension, a cell slurry, a cell lysate, a cell culture medium, a cell growth medium, or a combination thereof, or a filtrate or supernatant thereof.

In one embodiment of the use or process, the use or process comprises an additional step of washing the separation medium between the steps of contacting the separation medium with the feed stream and recovering the at least one target analyte. In one embodiment washing comprises passing a wash buffer through, or at least partially through, the separation medium to remove unbound target analytes, other unbound components of the feed stream and/or any residual suspended solids from the separation medium without removing the target analyte bound to the separation medium. In one embodiment the wash buffer maintains the conditions in the feed stream under which the target analyte bound to the separation medium. In one embodiment the conditions are at least one of pH, salinity, conductivity, or temperature.

A skilled worker will appreciate that other conditions may also be involved in the binding of the target analyte to the separation medium. It is believed that maintaining the appropriate conditions to maintain binding between the target analyte and the separation medium during the additional wash step is within the skill of those in the art.

The recovery step is performed after passing the feed stream through the separation medium. Preferably the feed stream is passed through the separation medium without any pre-processing of the feed stream to remove suspended solids and/or non-target analytes.

For example, suspended solids that may be present in a feed stream include cells or cellular-debris that may be present in cell culture medium, cell preparation or cell lysate, but not limited thereto. By way of further example, the cells or cellular debris may be from bacteria such as *Escherichia coli, Corynebacterium*, and/or *Pseudomonas fluorescens*, yeasts such as *Saccharomyces cerevisiae* and *Pichia pastoris*, filamentous fungi such as *Aspergillus, Trichoderma* and *Myceliophtyora*, protists such as *Leishmania*, Baculovirus infected insect cells such as Sf9, Sf21, and High Five, plants such as *Nicotiana* or *Arabidopsis*, and mammalian cells such as cells of *Mus musculus*, cells of *Bos primigenius*, chinese hamster ovary (CHO) cells, baby hamster kidney cells, human embryonic kidney cells, and human cancer cells (HeLa), but not limited thereto.

Recovery may be performed using standard methods known in the art, and dependant on the nature of the binding interaction between the target analyte and the ligand comprised in the separation medium, recovery conditions can be readily determined by the skilled worker.

In one embodiment of the use or process recovering comprises eluting the at least one target analyte from the separation medium. In one embodiment eluting comprises contacting the separation medium with a buffer. In one embodiment contacting comprises passing the buffer through, or at least partially through, the separation medium.

In another embodiment of the use or process the analyte is recovered by cleaving the ligand from the separation medium.

In one embodiment of the use or process at least 1%, preferably at least 5%, preferably at least 10%, preferably at least 20%, preferably at least 30%, preferably at least 40%, preferably at least 50%, preferably at least 60%, preferably at least 70%, preferably at least 80%, preferably at least 90%, preferably at least 95%, preferably at least 99% of the at least one target analyte that was present in the feed stream before contacting to the separation medium is recovered. Preferably at 40% to 60% of the at least one target analyte is recovered, preferably about 50%.

In one embodiment of the use or process substantially all of the at least one target analyte that was present in the feed stream before contacting the separation medium is recovered.

In another aspect the invention relates to a process for separating at least one target analyte from a feed stream comprising a) contacting a separation medium comprising a ligand that specifically and/or preferentially binds the at least one target analyte with a feed stream to bind the at least one target analyte to the separation medium, wherein the feed stream comprises suspended solids selected from the group consisting of tissues, tissue debris, cells, cell debris, biomolecules, and aggregates of biomolecules including aggregates of lipids, proteins, carbohydrates and/or nucleic acids, wherein the separation medium is a hydrogel having a structure whose surfaces are defined by a triply periodic minimal surface, wherein the structure of the hydrogel is selected from the group comprising a Schoen gyroid structure, a Schwarz diamond structure, a Schwartz Primitive structure and a Schoen IWP structure, preferably a gyroid structure, wherein the hydrogel is a thermoresponsive hydrogel, preferably a polysaccharide hydrogel, preferably an agarose or cellulose hydrogel, and wherein the hydrogel is functionalised with a ligand for use in ion exchange chromatography or hydrophobic interaction chromatography, and b) further comprising recovering the at least one target analyte from or bound to the separation medium.

In another aspect, the invention relates to a process for reducing the concentration of at least one target analyte in a feed stream comprising:

(a) contacting the separation medium with the feed stream, and (b) recovering the feed stream.

In another aspect, the invention relates to a process for reducing the concentration of at least one target analyte in a feed stream comprising:

(a) contacting the separation medium with the feed stream under conditions that allow the at least one target analyte to bind the separation medium, and (b) recovering the feed stream.

In another aspect, the invention relates to a process for reducing the concentration of at least one target analyte in a feed stream comprising:

(a) contacting the separation medium with the feed stream to bind the at least one target analyte to the separation medium, and (b) recovering the feed stream.

Conditions that allow the at least one target analyte to bind the separation medium are described herein with reference to the use and process of separation aspects of the invention and are equally applicable, as would be understood by the skilled worker, to a process of reducing according to the invention.

A skilled worker will appreciate that certain embodiments of the invention contemplated herein regarding the use of the separation medium to separate a target analyte from a feed stream, or the process of separating at least one target analyte from a feed stream are also applicable as embodiments of the process of the invention that is a process for reducing the concentration of at least one target analyte in a feed stream. Accordingly, all of such embodiments are specifically contemplated herein as part of the invention that is a process for reducing the concentration of at least one target analyte in a feed stream.

Additional embodiments of the process for reducing the concentration of at least one target analyte in a feed stream according to the invention are also described herein as embodiments of the "process of reducing of the invention".

In one embodiment of the process of reducing of the invention, the recovery step is performed by collecting the feed stream after passing the feed stream through the separation medium. In one embodiment the feed stream comprises suspended solids. Preferably the feed stream is passed through the separation medium without any pre-processing of the feed stream to remove suspended solids and/or non-target analytes.

Recovery may be performed using standard methods known in the art.

In one embodiment of the process of reducing, recovering comprises collecting the feed stream after contacting the separation medium with the feed stream, preferably after passing the feed stream through, or at least partially through the separation medium.

In one embodiment of the process of reducing, the feed stream has a reduced concentration of the at least one target analyte as compared to the concentration of the at least one target analyte in the feed stream before contacting the separation medium.

In one embodiment of the process of reducing, the concentration of the at least one target analyte in the feed stream is reduced by at least 1%, preferably at least 5%, preferably at least 10%, preferably at least 20%, preferably at least 30%, preferably at least 40%, preferably at least 50%, preferably at least 60%, preferably at least 70%, preferably at least 80%, preferably at least 90%, preferably at least 95%, preferably at least 99%.

In one embodiment of the process of reducing, contacting comprises binding substantially all of the target analyte to the separation medium.

In another aspect the invention relates to a product made by the process of the invention. In one embodiment the product is a composition containing a target analyte.

In another embodiment, the product is a feed stream containing a reduced concentration of a target analyte relative to the feed stream before the feed stream is contacted with the separation medium of the invention.

Various aspects of the invention will now be illustrated in non-limiting ways by reference to the following examples.

6. EXAMPLES

6.1 General Processes and Materials

Materials

The cellulose used was Sigmacell Cellulose powder, Type 20 (average particle diameter 20 µm), purchased from Sigma-Aldrich (Sigma-Aldrich, St. Louis, Mo., USA). Sodium Hydroxide (NaOH) (purity 97%) was purchased in pellet form from Thermo Fisher Scientific (Waltham, Mass., USA). Urea (ACS grade), and Epichlorohydrin (ECH) (purity 98%) were also purchased from Sigma-Aldrich. Agarose of the type Certified Molecular Biology Agarose, was purchased from Bio-Rad (Berkeley, Calif., USA). Industrial grade Acetone (purity 95%) was purchased from ASCC (Auckland, New Zealand). All chemicals were used as-received.

Printing of 3D gyroid mould for Examples 1-3

CAD (computer aided design) models of the moulds were created using solid works 2012 (Dessault systems, Paris, France). The moulds were printed on a Startasys Dimension Elite machine (Stratasys Ltd., Rehovot, Israel) using ABSplus in combination with soluble support material, which, after the print, was removed using the Stratasys SCA-1200 support removal system. The moulds were then rinsed with Milli-Q water and left at ambient conditions to dry for at least 7 days.

Printing of 3D mould for Examples 4-6 CAD (computer aided design) models of the moulds were created using solid works 2012 (Dessault systems, Paris, France). Moulds from ABSplus were printed on a Startasys Dimension Elite machine (Stratasys Ltd., Rehovot, Israel) in combination with soluble support material, which, after the print, was removed using the Stratasys SCA-1200 support removal system. The moulds were then rinsed with Milli-Q water and left at ambient conditions to dry for at least 7 days.

Moulds from Solidscape 3ZModel material were printed on a Solidscape 3Z PRO machine (Stratasys Ltd., Rehovot, Israel) in combination with Solidscape 3Z™Support material, which, after the print, was removed using a bath of Bioact VSO (Vantage Specialty Chemicals, Gurnee, Ill., USA) heated to 50 degrees Celsius. The moulds were then placed in an oven at 45 degrees Celsius to evaporate residual VSO for at least 48 hours.

Preparation of Cellulose Solution

To make the cellulose hydrogels used in the chromatographic media of the invention, an aqueous solution of 12 wt % urea and 7 wt % NaOH in Milli-Q water was prepared and cooled to 12° C.

Cellulose powder (5 wt %) was added to the solution which was stirred for approximately 60 seconds. The mixture was kept overnight at −12° C. and then stirred vigorously for approximately 5 min until the cellulose had dissolved completely. The solution was then centrifuged to remove any cellulose agglomerates. The solution was stored at ca. 1° C. until further use.

To produce all-cellulose composite hydrogels, a mass fraction of cellulose powder (10, 50, 100, etc. %) of the initially dissolved cellulose portion was dissolved into the cellulose solution using a L4RT Silverson mechanical mixer at approximately 800 rpm to act as reinforcement in the final hydrogel as well as a physical cross-linker during the gelation process.

The temperature of the solution was kept at 3-5° C. during the mixing process to avoid gelling of the solution. The suspension was stirred for approximately 5 minutes until the added powder was evenly dispersed in the original solution.

To produce chemically cross-linked hydrogels, a chemical cross-linker ECH was added as a mass fraction (1, 5, 10, etc. %) of the used cellulose (dissolved and eventual extra cellulose mixed into the solution) to the solution. The solutions containing the cross-linker were stirred for 5 minutes using the overhead stirrer at a rotational speed of approximately 1000 rpm to achieve good dispersion of the ECH. The temperature of the solution was kept at 3-5° C. during the mixing process to avoid gelling of the solution.

Preparation of Agarose Solution

To make the agarose hydrogels, agarose powder was mixed with Milli-Q water in a mass ratio of 6:94 using a Silverson L4RT mechanical mixer (Silverson Machines, Inc., East Longmeadow, Mass., USA) set at 800 rpm for approximately 60 sec to completely disperse the agarose powder.

Where a stronger hydrogel was desired, cellulose powder was added to the agarose-water mixture, weighed out as a mass fraction (10, 50, 100, etc. %) of the dispersed agarose powder and added to the agarose-water mixture. This mixture was then stirred using the Silverson mixer for another 120 sec at 100 rpm.

The agarose mixture was kept in a glass beaker, covered with Parafilm and then placed in a Samsung Timesaver 1000 W microwave oven (Samsung, Daegu, South Korea). The microwave was run for 30 sec at 1000 Watts to heat the mixture to approximately 75° C. The mixture was then stirred with a spatula and heated again at the same settings. This was repeated until all of the agarose powder was dissolved, forming a viscous solution. Any cellulose powder added remains undissolved.

Preparation of the separation media of the invention: agarose hydrogel of gyroid structure for Examples 1-3 The agarose solution was injected into the 3D printed gyroid mould using a disposable plastic syringe. The filled mould was placed in a microwave oven and heated for 10 sec at 100 Watts. The mould was rotated around its long axis and heated again. This was repeated 4-5 times to achieve a complete filling of the mould. Subsequently, the mould was placed in a freezer at −20° C. for 30 minutes to completely gel the agarose solution.

The filled mould was submerged in acetone in a Schott bottle. The closed bottle was placed in a 100 W Digitech Ultrasonic Cleaner (Digitech, South Jordan, Utah, USA) at room temperature for intervals of 30 min to dissolve the ABS mould. The acetone was exchanged after 8-10 sonication intervals until all of the ABS had been dissolved. The acetone was subsequently washed out using Milli-Q water to obtain the agarose hydrogel of gyroid structure.

Preparation of the separation media of the invention: cellulose hydrogel of gyroid structure for Examples 1-3 The cellulose solution was injected into the 3D printed gyroid mould using a disposable plastic syringe. The filled mould was placed in an oven at 85° C. for 5-6 hours to gel the solution. The mould was taken out of the oven and left to cool at room temperature. The ABS was removed as described above.

6.2 Example 1: Cellulose-Based Hydrogels of Gyroid Structure

Separation media of the invention comprising cellulose-based hydrogels of gyroid structure were prepared according to the procedures outlined above. Some hydrogels were prepared with ECH cross-linking (1 and 10%). Hydrogels were also prepared with added cellulose particles. Cellulose powder (10, 40, 50 and 100 wt % relative to the cellulose used to make the solution) was added. Hydrogels cross-linked with ECH and supported with cellulose powder were also prepared. FIG. 4 shows SEM micrographs of some of the hydrogels prepared.

6.3 Example 2: Agarose-Based Hydrogels of Gyroid Structure

Separation media of the invention comprising agarose-based hydrogels of gyroid structure were prepared according to the procedures outlined above. Some hydrogels were prepared with ECH cross-linking (1 and 10%).

Hydrogels were also prepared with added cellulose particles. Cellulose powder (10, 40, 50 and 100 wt % relative to the cellulose used to make the solution) was added.

Hydrogels cross-linked with ECH and supported with cellulose powder were also prepared. FIG. 4 shows SEM micrographs of some of the hydrogels prepared.

6.4 Example 3: Recovery of Target Cytochrome C from a Feed Stream Containing Suspended Solids Using Cation-Exchange Chromatography where the Separation Medium is a Hydrogel of Gyroid Structure An agarose hydrogel of gyroid structure was produced via a negative templating method from a 3D printed template using the techniques described above. It was used to separate two proteins in the presence of suspended yeast cells, without retention of the yeast cells.

The separation medium used in this experiment was a 25 mm long, 10 mm diameter monolith of agarose hydrogel of gyroid structure with channel sizes of 1.2 mm and wall thickness 1.2 mm. The porosity of the monolith was 50% and G=0 for the simple gyroid $$\sin(x)\cos(y)+\sin(y)\cos(z)+\sin(z)\cos(x)=G$$

where x, y and z are the locations of points within the column in a Cartesian coordinate system and G is an arbitrary constant that determines the relative volume fractions of the solid (adsorbent) and void (flow channel) portions within the column geometry.

The gyroid agarose monolith was produced by filling an ABS plastic printed negative template of the gyroid monolith with a hot solution of agarose and allowing it to gel through cooling to room temperature. The ABS was then removed by dissolving with acetone.

Carbonyldiimidazole Activation

Following removal of ABS using acetone, the hydrogel monolith was washed in six column volumes of acetone to ensure no residual ABS remained in the system.

The agarose monolith was activated using 1,1 carbonyldiimidazole (CDI) to provide an active imidazole intermediate on the backbone of the polymers of the agarose matrix. 0.2 g of CDI was added to the agarose monolith, which was suspended in 10 ml of acetone. The mixture was left to react for two hours under constant stirring.

The reaction mixture was removed and the monolith was quickly washed in six monolith volumes of acetone to remove unreacted CDI. It was essential the washing step was completed quickly to avoid hydrolysis of the activated agarose material.

Ligand Coupling

The ligand 6-aminohexanoic acid was coupled to the agarose hydrogel to introduce cation exchange functionality, namely —COOH groups. The monolith was added to a 6 ml solution of 0.5 M 6-aminohexanoic acid and 1 M sodium bicarbonate, made up to pH 10 using NaOH. 6-Aminohexanoic acid covalently bonds to the surface of the agarose via an amine linkage, with a free carboxyl group at the end of the ligand for cation exchange. The solution was reacted under constant stirring for 48 hours, after which it was placed in sodium phosphate buffer at pH 7 (if not being used for protein separation immediately after ligand coupling).

Separation

The coupled functionalised hydrogel of gyroid structure was removed from the reaction vessel, placed in a 10 mm diameter SNAP glass column (Sorbent Technologies Inc., Norcross, Ga.) and connected to an AKTA Start liquid chromatography system (GE Healthcare Technologies, Uppsala, Sweden). The column was connected to the system using an upflow configuration.

The system was washed with sodium phosphate buffer at pH 7 (binding buffer) until the hydrogel was fully saturated in buffer, then washed with sodium phosphate buffer and 1 M NaCl at pH 7 (elution buffer) to add counter ions to the ion exchange matrix. After equilibrium was achieved, the column was re-equilibrated into the binding buffer.

A 2 ml solution of 5 mg/ml *Saccharomyces cerevisiae*, 2 mg/ml bovine serum albumin (BSA) and 2 mg/ml cytochrome C in binding buffer at pH 7.4 was loaded on to the column. Cytochrome C (isoelectric point, pI, 9.6) was expected to bind to the column, while BSA (pI 4.7) and the yeast cells (pI typically 5.2 to 6.4) were expected to pass through.

FIG. 7 shows the column after completing sample loading and wash steps, showing clearly by the red colour that cytochrome C had bound to the column. Following washing with approximately 25 ml of binding buffer (until all unbound protein was removed), the elution buffer (1M NaCl) was applied to the column until it was apparent (by observing the reduction in UV absorbance in the fluid exiting the column) that all bound protein had been removed.

Collected peak fractions were analysed using gel electrophoresis. The fractions were centrifuged for five minutes at room temperature to remove the yeast solids from the solution before being applied to the gel. A Coomassie Brilliant Blue stain was applied to the gel for 12 hours, which was then de-stained with acetic acid solution to reveal the protein ladders.

The density of bands on the gel was measured using open-source ImageJ software, which gave relative intensities that can show the proportional concentrations of BSA and cytochrome C present in each peak of the chromatogram, compared with the band on the on-sample lane.

Results

The separation process of the invention successfully recovered cytochrome C from a feed stream containing solids.

Chromatographic analysis (as shown in FIG. 8) shows a high flowthrough peak centred at around 5 ml, where yeast, BSA and some cytochrome-C were eluted from the system without interacting with the column.

The elution peak accompanying the sharp increase in conductivity at around 35 ml contained only cytochrome C, as can be seen in FIG. 9.

Gel electrophoresis confirmed the separation of cytochrome C from BSA and yeast (FIG. 9); the lanes corresponding to feed sample and flowthrough peaks (Lanes 2 through 10) show BSA at 66.5 kDa and cytochrome C at 12.3 kDa. Less distinct bands on the gel in Lanes 2 through 6 likely arise from proteins excreted from either intact or disrupted yeast cells present in the on-sample and flowthrough peaks. Lanes 7-10 show the progressive removal of unbound material, consistent with the chromatogram in FIG. 8; however yeast appears to have been removed from the column much faster than protein, indicating no hindrance to yeast cell flow.

Upon application of elution buffer, the UV peak in FIG. 8 showed elution of protein, with evidence of pure cytochrome C in the elution sample. This is apparent in the gel in Lanes 11-17 (see FIG. 9), which shows the elution peak and subsequent removal of cytochrome C from the agarose gyroid column. This validates the separation of cytochrome C from a mixture of yeast cells, cytochrome C and BSA using a cation exchange chromatography column, produced using 3D printing methods.

The amount of cytochrome C bound and subsequently eluted from the gel was approximately 50% of the total amount loaded onto the column, inferred from the relative band intensities for each lane on the gel (FIG. 10).

Areas under peaks in the chromatogram gave 1632 mAU ml for the flowthrough peak and 521 mAU ml in the elution peak. The larger flowthrough peak area would be caused by the presence of BSA, unbound cytochrome C and yeast cells, compared with only eluted cytochrome C in the elution peak.

Negligible back-pressure was observed throughout the chromatography run. During normal operation, 0 MPa was recorded, which increased to 0.01 MPa upon the application of yeast. This returned to 0 MPa once the flowthrough peak had passed through the system. The lack of back-pressure indicates that yeast was not captured in the column but flowed through during sample application and wash steps.

Conclusions

The agarose hydrogel of gyroid structure successfully carried out a chromatographic separation of cytochrome C by cation exchange from a feed stream comprising suspended solids, the feed stream comprising a mixture of BSA, cytochrome C and yeast cells. Yeast cells passed through the column as expected.

BSA was not retained by the hydrogel column, while about 50% of the cytochrome C in the sample was bound to the hydrogel column and was subsequently eluted by application of 1 M NaCl.

6.5 Example 4: Production of 3D Printed Agarose DEAE Column and Recovery of Target Cytochrome C from a Feed Stream Containing Suspended Solids Using Anion-Exchange Chromatography where the Separation Medium is a Hydrogel of Gyroid Structure This work demonstrates the first 3D printed anion exchange chromatography, used as a simple protein purification system and a more complex protein capture step for a solution of protein and solid (*S. cerevisiae*) which simulates a fermentation broth.

Methods

DEAE Functionalisation

The 3D printed agarose column (6% w/w agarose, 50 mm long, 10 mm diameter, 400 μm channel size, 50% voidage) prepared using a template printed from Solidscape 3Z™Model material as described in detail in the methods above, was functionalized with the DEAE ligand 2-chloro-N,N-diethylethylamine hydrochloride using a method based on that developed by Toufik and Labarre (Toufik, J., & Labarre, D. (1995), *Relationship between reduction of complement activation by polysaccharide surfaces bearing diethylaminoethyl groups and their degree of substitution*. Biomaterials, 16(14), 1081-1088. doi: 10.1016/0142-9612 (95)98904-s). The agarose was placed in 4 M NaOH and 3 M DEAE at a ratio of 1 g agarose: 27 ml DEAE: 20 ml NaOH and stirred in a water bath at 30° C. for 90 minutes. Following activation, the column was washed in 15 ml of 1 M NaCl, then washed in 15 ml 1 M NaOH followed by 15 ml 1 M HCl three times. The column was stored in 20% isopropanol until used.

Equilibration

Using an AKTA Start unit, the agarose column was placed in a SNAP casing and attached to the AKTA. 70% IPA was passed through the column at 5.0 ml/min to remove any air that entered the column while it was transferred to the SNAP casing. The column was then equilibrated with three column volumes of 20 mM sodium phosphate buffer+1 M NaCl pH 7.0 (to add counter ions to the matrix) then three column volumes of 20 mM sodium phosphate buffer pH 7.0.

Dynamic Testing 2.5 mg/ml BSA was loaded onto the column via a 2.0 ml injection loop. Unbound sample was washed out with binding buffer, and after four column volumes, the salt buffer was applied to the column to promote protein elution.

Protein Separation

A 2.0 ml solution of 2.5 mg/ml BSA and 1 mg/ml cytochrome c from bovine heart was loaded onto the column through the injection loop. The same procedure for washing and elution as above was followed. 2.0 ml fractions for this run were collected and analysed using SDS-PAGE with a Coomassie Blue stain.

Solid Passage

Three runs were completed for this analysis: 0.5 w/w % yeast; 2.0 mg/BSA; and 2.0 mg/ml BSA and 0.5 w/w % yeast. Yeast samples were prepared by adding the required mass of dried baker's yeast to 20 mM sodium phosphate buffer, pH 7.0 and mixed for 1 hr until all granules were broken down to a slurry. The SNAP column with DEAE agarose was connected to an AKTA10 Explorer and equilibrated. For each run, the sample was loaded onto the column, with buffers (binding and elution) added as before. 4 ml fractions were collected from each run; the optical density at 600 nm of each sample was measured on the Spectrophotometer to quantify yeast passage. Following each run, the column was washed with 1 M NaOH to remove any yeast that may be stuck in the hardware or the column.

Results and Discussion

It is clear that the DEAE agarose column is a successful anion exchange column. With the application of BSA sample and subsequent elution in salt buffer, approximately 51.6% of BSA is bound to the column and subsequently eluted (FIG. 11, Table 1).

TABLE 1

| Peak area | | |
| --- | --- | --- |
| Flow through peak (mAu*ml) | Elution peak (mAu*ml) | Eluted (%) |
| 157 | 167 | 51.6% |

The successful separation of cytochrome C from a mixture of cytochrome C and BSA (FIG. 12) further proves the anion exchange capability of the column produced in this work. At a buffer pH of 7.0, BSA is negatively charged (pI=4.7) and cytochrome C is positively charged (pI range 10-10.5). Therefore BSA will bind to the column, while cytochrome C, with a like-charge to the column, will pass through.

From the chromatogram, it is clear that more protein flows through the column than when BSA only is applied (FIG. 11, FIG. 12). The flow through peak is much greater in the combined protein analysis, while the elution peak is of similar intensity, indicating the same amount of BSA is bound to the column.

Gel electrophoresis of the fraction collected from the BSA/cytochrome C run confirms what is in the flowthrough and elution peaks in FIG. 12. BSA (MW=66.5 kDa) and cytochrome C (Mw=12.3 kDa) are apparent on the gel in the on sample (ON) (FIG. 13). Dimers of both proteins are also apparent. The lanes representing the flow through peak show BSA and cytochrome C, with subsequent washing of the unbound sample showing residual amounts of both proteins. Upon elution (lanes 8-14) only BSA is present in the gel, confirming only BSA bound to the column.

The 3D printed agarose DEAE column allows solid passage, however there is an amount of yeast bound to the column, which elutes off. Analysis of the optical density at 600 nm shows solid passage throughout the run; with BSA only there is no change in OD at 600 nm during binding, washing and elution, indicating no solids in the run, which means any absorbance detected at 600 nm indicates yeast (FIG. 14). With yeast and yeast/BSA, there is a clear flowthrough peak and elution peak signifying yeast binding to column and then eluted under salt conditions. Approximately 83.4% of the yeast flows through the column, with the remainder eluting with increased salt concentration.

The skilled worker can modify the conditions as appropriate so that the effect of this is reduced, for example, with the addition of salt to the binding buffer reducing the ionic strength of the solution and preventing yeast from binding to the column.

Conclusions

A 3D printed agarose DEAE column has been produced. The column operates as an anion exchanger for protein purification; separation of a mixture of BSA and cytochrome C confirms this, and an anion exchanger in the presence of yeast. As predicted, yeast interacts with the anion exchange groups, however manipulation of buffer conditions would control this.

6.6 Example 5: Production of 3D Printed Agarose Hydrophobic Interaction Column and Recovery of α-Lactalbumin from a Feed Stream Containing Suspended Solids where the Separation Medium is a Hydrogel of Gyroid Structure This work demonstrates the first 3D printed hydrophobic interaction chromatography column, used as a simple protein purification system and a more complex protein capture step for a solution of protein and solid (S. cerevisiae) which simulated a fermentation broth.

The agarose gyroid matrix was activated with CDI and then coupled to benzylamine to create a hydrophobic matrix through the extremely hydrophobic benzyl group immobilized to the surface. Capture of α-lactalbumin on the column is demonstrated, as well as capture of two proteins in a solution (although separation of the proteins is unsuccessful). Approximately 65% of the protein applied to the column is captured, meaning the efficiency should be improved. Finally, capture of α-lactalbumin from a solution of yeast cells is also demonstrated, but only 73% of the yeast passes through the column because of the interaction between yeast and the column which is largely unreported in literature.

Methods

CDI Activation and Benzylamine Functionalisation

The 3D printed agarose column (6% w/w agarose, 50 mm long, 10 mm diameter, 400 μm channel size, 50% voidage) made using a mould from Solidscape 3ZModel material was activated with 1,1'-carbonyl diimidazole (CDI) and subsequently coupled to the benzylamine ligand using methods adopted from literature (Bethal, G. S., Ayers, J. S., Hearn, M. T. W., & Hancock, W. S. (1987). Investigation of the activation of various insoluble polysaccharides with 1,1'-carbonyldiimidazole and of the properties of the activated matrices. Journal of Chromatography A, 219(3), 361-371. doi: http://dx.doi.org/10.1016/S0021-9673(00)80379-9), and Hermanson, Millia & Smith, 1992 (Hermanson, G. T., Mallia, A. K., & Smith, P. K. (1992) Immobilized affinity ligand techniques: Academic Press).

The agarose column was placed in a 50 mL falcon tube and sequentially washed into acetone (at ratios of 30/70, 50/50, 70/30 then 100/0% acetone/% water), then left in 100% acetone for the activation. 0.084 g CDI/g agarose was added to the agarose and acetone and left for 1 hour at room temperature on a spinning wheel to ensuring consistent mixing. After an hour, the liquid was removed from the agarose, then acetone was used to wash any unreacted liquid trapped in the column channels. Fresh acetone was added to the column in the falcon tube, to which a volume of benzylamine was added at a ratio of 1:0.11 acetone:benzylamine. This was left to react on a spinning wheel for 24 hours. Once ligand coupling was completed, the liquid was decanted from the falcon tube. Two column volumes of acetone were applied to the column to remove any unreacted benzylamine. The column was then stored in 20% isopropyl alcohol (IPA) until use.

Equilibration

Using an AKTA10 Explorer unit, the agarose column was placed in a SNAP casing and attached to the AKTA. 70% IPA was passed through the column at 5.0 ml/min to remove any air that entered the column while it was transferred to the SNAP casing. The column was then equilibrated with three column volumes of 20 mM sodium phosphate buffer+2 M $(NH4)2504$ pH 6.0 (binding buffer). An elution buffer of 20 mM sodium phosphate pH 6.0 was also prepared.

Dynamic Testing 2.0 mg/ml α-lactalbumin was loaded onto the column via a 2.0 ml injection loop at 1 ml/min. Unbound sample was washed out with binding buffer, and after four column volumes, the elution buffer was applied to the column to promote protein elution through reducing hydrophobic interactions. At the end of the run, the column was flushed with two column volumes of 70% IPA to remove any α-lactalbumin that was not removed with elution buffer.

Dual Protein Elution

A 2.0 ml solution of 2.0 mg/ml α-lactalbumin and 2 mg/ml bovine serum albumin (BSA) was loaded onto the column through the injection loop at 1 ml/min. The same procedure for washing and elution and cleaning as above was followed. 2.0 ml fractions for this run were collected and analysed using SDS-PAGE with a Coomassie Blue stain.

Solid Passage

Three runs were completed for this analysis: 0.5 w/w % yeast; 2.0 mg/ml α-lactalbumin; and 2.0 mg/ml α-lactalbumin and 0.5 w/w % yeast. Yeast samples were prepared by adding the required mass of dried baker's yeast to 20 mM sodium phosphate buffer, 2 M $(NI-14)2504$, pH 6.0 and mixed for 1 hr until all granules were broken down to a slurry. The SNAP casing with benzylamine column inserted was connected to the AKTA10 Explorer and equilibrated. For each run, the sample was loaded onto the column, with buffers (binding and elution) added as before at 1 ml/min. 4 ml fractions were collected from each run; the optical density at 600 nm of each sample was measured on the Spectrophotometer to quantify yeast passage. Following each run, the column was washed with two column volumes of both 70% IPA and 1 M NaOH to remove any protein or yeast that may be stuck in the hardware or the column.

Results and Discussion

Protein capture on the benzylamine agarose hydrophobic matrix is demonstrated from the chromatogram (FIG. 15). The peaks on the absorbance at 280 nm axis demonstrate where protein is eluted from the column. The first peak between 1.5-10 ml added is the flow through of unbound α-lactalbumin. It is apparent no protein is washed from the column up to approximately 24 ml of buffer added, meaning that once the buffers are changed and the conductivity decreases the protein that is eluted here corresponds to protein eluted because of reducing hydrophobic interaction (decreasing salt concentration), thus proving successful protein capture based on hydrophobicity. Analysis of the peak sizes shows that 65% of protein is captured and subsequently eluted with the elution buffer. Further optimization of the chromatographic conditions by the skilled worker may be carried out to increase the percent capture of a desired target analyte.

In the presence of yeast, α-lactalbumin is bound to the benzylamine agarose column and subsequently eluted in the presence of elution buffer (FIG. 16). This is concluded based on the combined absorbance chromatograms at 280 nm for three trials: α-lactalbumin, yeast, and α-lactalbumin+yeast. The α-lactalbumin line shows approximately equal amounts of protein flow through and eluted. For yeast only, a large flow though peak at 280 nm and small elution peak is observed. This indicates a small amount of yeast is bound to the column due to some extracellular proteins associated with yeast having an interaction with the column. For α-lactalbumin with yeast a large flow through peak (approximately the size of the combined α-lactalbumin flow through and yeast flowthrough) is recorded, with an elution peak similar to the size of the elution peak in the α-lactalbumin run. This indicates similar performance of the column with and without solids present in the feed broth, showing yeast does not inhibit the performance of the benzylamine agarose column.

Yeast passage through the column is observed by monitoring the UV absorbance at 600 nm on the chromatogram. As before, three trials were conducted: α-lactalbumin, yeast, and α-lactalbumin with yeast. The α-lactalbumin run shows α-lactalbumin has a very small absorbance at 600 nm. The yeast only run has a large flow through peak and small elution peak—again proof of some adsorbent-adsorbate interaction. The yeast and α-lactalbumin with yeast track essentially the same over both runs, showing the yeast passage is the same in both trials. Comparison of the peak intensities show that 73% of yeast flows through the column. Optimisation would be required to reduce the interaction between the yeast cells and proteins and the column; this would be done through changing salt concentration and pH.

It should be noted in FIG. 17 that the long tail for each trial after the elution peak indicates a new baseline of 25 mAu due to the change in buffer; the elution buffer has a higher UV absorbance at 600 nm than the binding buffer.

Conclusions

A 3D printed agarose benzylamine column has been produced. The column operates as a hydrophobic interaction chromatography matrix for protein purification; capture of α-lactalbumin and BSA with subsequent elution in low-salt buffer proves this. The efficiency of protein capture (currently 65%) may be improved with optimizing activation and ligand coupling protocols.

6.7 Example 6: Production and Use of (a) 3D Printed Schwarz Diamond Agarose Cation Exchange (CM) Chromatography Column and (b) Schoen Gyroid Cellulose Cation Exchange (CM) Chromatography Column and This work details the creation of two 3D printed chromatography columns functionalized with cation exchange ligands to create a carboxy methyl cation exchanger. The first column was a 6% agarose column, created using 3D printing methods into a Schwarz Diamond structure with 50% voids. The second column was a 5% cellulose column made into a Schoen Gyroid structure with 50% voids. The agarose and cellulose hydrogels were prepared using the methods described above using moulds made from made from Solidscape 3ZModel material.

Capture of cytochrome C onto both columns is demonstrated, with a capture efficiency of 37% for the agarose Schwarz diamond, and 89.2% for the cellulose Schoen gyroid. Both columns were also demonstrated to have a similar capture efficiency in the presence of solids (*Saccharomyces cerevisiae*), although yeast passage in the cellulose gyroid was higher than that in the agarose Schwarz diamond.

Methods

Column Specifications

The Schwarz Diamond column was 50 mm long, 10 mm diameter, 500 μm channel, 50% void column made of 6% agarose hydrogel. The Schoen Gyroid column was a 50 mm long, 10 mm diameter, 400 μm channel, 50% void column made of 5% cellulose hydrogel with 50% added cellulose crosslinked with 5% epicholorhydrin.

CDI Activation and Ligand Coupling

The same functionalisation method was followed for both columns. Methods from Bethell et al (Bethell, G. S., Ayers, J. S., Hearn, M. T. W., & Hancock, W. S. (1987). Investigation of the activation of various insoluble polysaccharides with 1,1'-carbonyldiimidazole and of the properties of the activated matrices. Journal of Chromatography A, 219(3), 361-371. doi: http://dx.doi.org/10.1016/S0021-9673(00)80379-9) and Hermanson, Millia & Smith, 1992 (Hermanson, G. T., Mallia, A. K., & Smith, P. K. (1992). Immobilized affinity ligand techniques: Academic Press) were adapted for agarose and cellulose activation and subsequent ligand coupling: 1, 1'carbonyl diimidazole (CDI) was used to activate the hydroxyl groups in the polysaccharide gels, and 6-aminohexanoic acid was coupled to the activated matrix to create cation exchange groups on the surface through carboxyl groups present in the ligand. The columns were sequentially washed from aqueous into acetone, with three column volumes of the following mixtures of % acetone/% water added: 30/70, 50/50, 70/30, 100/0. Following this, the columns were placed in three column volumes of fresh acetone to which 0.2 g CDI was added. Each mixture was left on a spinning wheel for 1 hr. Following activation, the reactant mixture was decanted from the column, the column was then washed with two column volumes of acetone to remove unreacted CDI groups. To couple the ligand 6-aminohexanoic acid to the agarose column, the column was added to a 6 ml solution of 0.5 M 6-aminohexanoic acid and 1 M sodium bicarbonate, made up to pH 10 using NaOH. 6-Aminohexanoic acid forms a covalent bond to the surface of the agarose via an amine linkage, with a free carboxyl group at the end of the ligand for cation exchange. The solution was reacted under constant stirring for 48 hours, after which was placed in sodium phosphate buffer at pH 7 (if not being used for protein separation immediately after ligand coupling).

Equilibration

All dynamic testing was conducted on an AKTA10 Explorer, where the activated 3D printed column was placed in a glass SNAP column casing and attached to the AKTA. The column was washed with five column volumes of 70% isopropyl alcohol (IPA) to remove any air from the channels. Three column volumes of elution buffer (20 mM sodium phosphate+1 M NaCl, pH 7.0) were washed onto the column to add counter ions to the cation exchange groups. The column was then equilibrated with three column volumes of binding buffer (20 mM sodium phosphate buffer, pH 7.0) to prepare the column for protein sample application.

Protein Binding 2.0 ml of 2.0 mg/ml cytochrome C was loaded on to the column at 1 ml/min. The column was then washed with 4.5 column volumes of binding buffer to remove the unbound sample. Finally, 4 column volumes of elution buffer were applied to the column to elute bound cytochrome C from the column. The column was then re-equilibrated with binding buffer in preparation for the next run.

Protein Binding in the Presence of Yeast 0.25% wt/wt baker's yeast was mixed into 2.0 ml binding buffer. This was then loaded onto the newly equilibrated column, with washing, and elution procedures the same as above. The column was then washed with three column volumes of 1 M NaOH to remove any yeast cells stuck in the column or AKTA hardware. The column was then re-equilibrated with binding buffer as above. Another 0.25% wt/wt yeast solution was made up, which was then spiked with 2.0 mg/ml cytochrome C. This was applied to the column following the same procedure as before.

Results and Discussion (a) Schwarz Diamond Agarose

Monitoring the UV absorbance at 280 nm over the course of the run (FIG. 18) shows that 37% of cytochrome C loaded on to the column is bound and subsequently eluted with the addition of salt elution buffer. This proves the capability of the column as a cation exchanger, as in the buffer solution pH 7.0, the cytochrome C (with a pI 10.0-10.5) is positively charged, meaning that it will bind to the negatively charged cation exchange ligands coupled to the agarose matrix. However the binding efficiently is quite low; this may be optimised by changing buffer type and salt concentration.

Analysis of the UV absorbance at 280 nm from the cytochrome C, yeast, and cytochrome C and yeast runs show that both cytochrome C and yeast have an absorbance at this wavelength (FIG. 19). This means that cell and protein cannot be isolated, however the intensity of the peaks for the cytochrome C and yeast run are the sum of the peaks in the cytochrome C only and yeast only runs. This shows that in the presence of yeast, cytochrome C capture is not largely affected, confirming the capability of the Schwarz D agarose cation exchanger as a protein capture mechanism in the presence of solids.

UV absorbance at 600 nm shows the passage of solids, however it is clear that there is slight detection of cytochrome C at 600 nm due to the peak in the absorbance spectrum for cytochrome C at 550 nm (the proximity between the values causes a non-zero for cytochrome C at 600 nm). Again, the peaks detected in the cytochrome C and yeast run are equal to the sum of the cytochrome C only and yeast only runs (FIG. 20).

The results shows that yeast passage in the Schwarz D agarose cation exchanger is 94.2%. The reason for the small amount of protein bound to the column is because of the interaction between the cation exchanger and some parts of the yeast cell broth. Tari et al report an interaction coefficient of 0.095 at this conductivity (Tari, C., Vennapusa, R. R., Cabrera, R. B., & Fernandez-Lahore, M. (2008), Colloid deposition experiments as a diagnostic tool for biomass attachment onto bioproduct adsorbent surfaces. Journal of Chemical Technology and Biotechnology, 83(2), 183-191. doi: 10.1002/jctb.1852) (cell affinity to the resin increases with salt concentration), so some binding of yeast is expected and would result in approximately 10% of the protein binding.

(b) Schoen Gyroid Cellulose

The same analysis from the Schwarz D agarose cation exchanger is applied here. The capture efficiency and yeast passage will be reported. The remainder of the discussion essentially remains the same.

Protein capture on the Schoen Gyroid agarose column is demonstrated on the chromatogram (FIG. 21). A small flow through peak is observed compared with the elution peak, equating to a cytochrome C capture of 89.2%.

The combined UV absorbance at 280 nm shows there is little change in behaviour between the capture of cytochrome C on the column in buffer only and when it is in a yeast mixture, meaning the presence of solids does not perturb protein binding capacity. Yeast passage is calculated from the UV absorbance at 600 nm (FIG. 23). Analysis of the relative peak intensity for the yeast only curve gives a yeast passage of 94.5%.

Conclusions

This work confirms that a unique geometry, Schwarz Diamond, may be used as the structure of a 3D printed cation exchange chromatography column for solid tolerant chromatography. Protein capture efficiency of 37% is achieved, and is not decreased when a part of a suspended solid broth. The cell passage of the broth is 94.2%, showing the capability of the column to process both protein and cells.

Also demonstrated is the possibility for cellulose to be used as a 3D printed cation exchange chromatography column for solid tolerant chromatography. Here, protein capture efficiency is much higher (89%), and solid passage is 94.5%.

7. INDUSTRIAL APPLICABILITY

The separation media of the invention can be used to obtain target analytes from feed streams. Where the feed streams contain suspended solids, the separation media can be used directly, without the need for the solids to first be removed.

What we claim is:

1. A separation medium in the form of a monolithic column, comprising a hydrogel having internal channels, wherein the internal channels of the hydrogel are of a structure whose surfaces are defined by a triply periodic minimal surface, wherein the hydrogel is functionalized with at least one ligand that binds at least one target analyte for use in affinity chromatography, ion exchange chromatography, hydrophobic interaction chromatography, multimodal chromatography or gel permeation chromatography.

2. The separation medium according to claim 1 wherein the internal channels of the hydrogel are of a structure selected from the group consisting of a Schoen gyroid structure, a Schwarz diamond structure, a Schwartz Primitive structure and a Schoen IWP structure.

3. The separation medium according to claim 1 wherein the internal channels of the hydrogel are of a gyroid structure.

4. The separation medium according to claim 1 wherein the hydrogel is a thermoresponsive hydrogel.

5. The separation medium according to claim 1 wherein the hydrogel is a polysaccharide hydrogel.

6. The separation medium according to claim 5 wherein the hydrogel is an agarose hydrogel.

7. The separation medium according to claim 5 wherein the hydrogel is a cellulose hydrogel.

8. The separation medium according to claim 1 wherein the hydrogel is functionalized with a ligand for use in ion exchange chromatography or hydrophobic interaction chromatography.

9. The separation medium according to claim 1 wherein the ion exchange chromatography is cation exchange chromatography.

10. The separation medium according to claim 9, wherein the ligand for use in cation exchange chromatography has a functional group selected from carboxyl and sulphonic acid.

11. The separation medium according to claim 1 wherein the ion exchange chromatography is anion exchange chromatography.

12. The separation medium according to claim 11, wherein the ligand for use in anion exchange chromatography has a functional group selected from amines, quaternary amines and diethylamine (DEAE).

13. The separation medium according to claim 1 wherein the ligand for use in hydrophobic interaction chromatography has a functional group selected from alkyl chains, phenyl and benzylamine groups.

14. A chromatographic apparatus comprising a separation medium wherein the separation medium is comprised of a hydrogel having internal channels, wherein the internal channels of the hydrogel are of a structure whose surfaces are defined by a triply periodic minimal surface, the hydrogel functionalized with at least one ligand that binds at least one target analyte for use in affinity chromatography, ion exchange chromatography, hydrophobic interaction chromatography, multimodal chromatography or gel permeation chromatography.

15. A process for separating at least one target analyte from a feed stream comprising contacting a separation medium, wherein the separation medium comprises a hydrogel having internal channels, wherein the internal channels of the hydrogel are of a structure whose surfaces are defined by a triply periodic minimal surface, the hydrogel functionalized with at least one ligand that binds at least one target analyte for use in affinity chromatography, ion exchange chromatography, hydrophobic interaction chromatography, multimodal chromatography or gel permeation chromatography, with the feed stream to bind the at least one target analyte to the separation medium.

16. The process according to claim 15 wherein the separation medium is contacted with the feed stream under conditions that allow the at least one target analyte to bind to the separation medium.

17. The process of claim 15, wherein the feed stream comprises suspended solids, preferably wherein the suspended solids are selected from the group consisting of tissues, tissue debris, cells, cell debris, biomolecules, and aggregates of biomolecules including aggregates of lipids, proteins, carbohydrates and nucleic acids.

18. The process of claim 15 further comprising recovering the at least one target analyte from or bound to the separation medium.

19. The process according to claim 15, wherein the at least one target analyte is selected from the group consisting of antibodies, antigen binding fragments of antibodies and proteins such as cytochrome C and a-lactalbumin.

20. A process for reducing the concentration of at least one target analyte in a feed stream comprising:
    (a) contacting a separation medium with the feed stream wherein the separation medium comprises a hydrogel having internal channels, wherein the internal channels of the hydrogel are of a structure whose surfaces are defined by a triply periodic minimal surface, the hydrogel functionalized with at least one ligand that binds the at least one target analyte and
    (b) recovering the feed stream.

21. The process according to claim 20 wherein the separation medium is contacted with the feed stream under conditions that allow the at least one target analyte to bind to the separation medium.

22. The process according to claim 20, wherein the feed stream comprises suspended solids, wherein the suspended solids are selected from the group consisting of tissues, tissue debris, cells, cell debris, biomolecules, and aggregates of biomolecules including aggregates of lipids, proteins, carbohydrates and nucleic acids.

23. The process according to claim 20, wherein the at least one target analyte is selected from the group consisting of antibodies, antigen binding fragments of antibodies and proteins such as cytochrome C and a-lactalbumin.

24. A process for separating at least one target analyte from a feed stream comprising
  a) contacting a separation medium with the feed stream, the separation medium comprising a ligand that binds the at least one target analyte,
    wherein the feed stream comprises suspended solids selected from the group consisting of tissues, tissue debris, cells, cell debris, biomolecules, and aggregates of biomolecules including aggregates of lipids, proteins, carbohydrates and nucleic acids,
    wherein the separation medium is a hydrogel having internal channels, wherein the internal channels of the hydrogel are of a structure whose surfaces are defined by a triply periodic minimal surface,
    wherein the internal channels of the hydrogel are of a structure selected from the group consisting of a Schoen gyroid structure, a Schwarz diamond structure, a Schwartz Primitive structure and a Schoen IWP structure, preferably a gyroid structure,
    wherein the hydrogel is a thermoresponsive polysaccharide hydrogel and
    wherein the hydrogel is functionalized with a ligand for use in ion exchange chromatography or hydrophobic interaction chromatography, and
  b) further comprising recovering the at least one target analyte from or bound to the separation medium.

* * * * *

UNITED STATES PATENT AND TRADEMARK OFFICE
CERTIFICATE OF CORRECTION

| | | |
|---|---|---|
| PATENT NO. | : 11,065,601 B2 | Page 1 of 1 |
| APPLICATION NO. | : 16/063468 | |
| DATED | : July 20, 2021 | |
| INVENTOR(S) | : Fee et al. | |

It is certified that error appears in the above-identified patent and that said Letters Patent is hereby corrected as shown below:

In the Specification

Column 9, Line 56: "diethylamine" should read "diethylaminoethyl".

In the Claims

Column 27, Line 67: "diethylamine" should read "diethylaminoethyl".

Signed and Sealed this
Twenty-sixth Day of July, 2022

Katherine Kelly Vidal
*Director of the United States Patent and Trademark Office*